Figure 78:
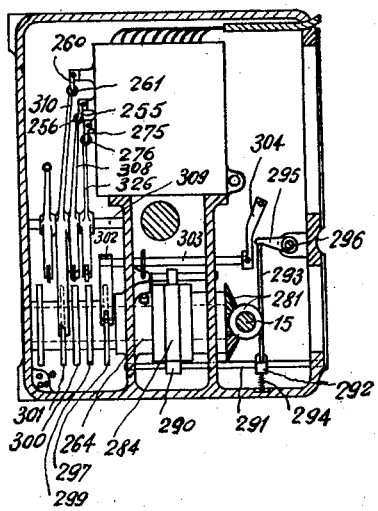

March 15, 1932.  M. SCHENKER  1,849,642
METHOD FOR CONTROLLING MOTIONS, PARTICULARLY
IN THE MACHINING OF SOLID MATERIALS
Filed June 18, 1930    13 Sheets-Sheet 1
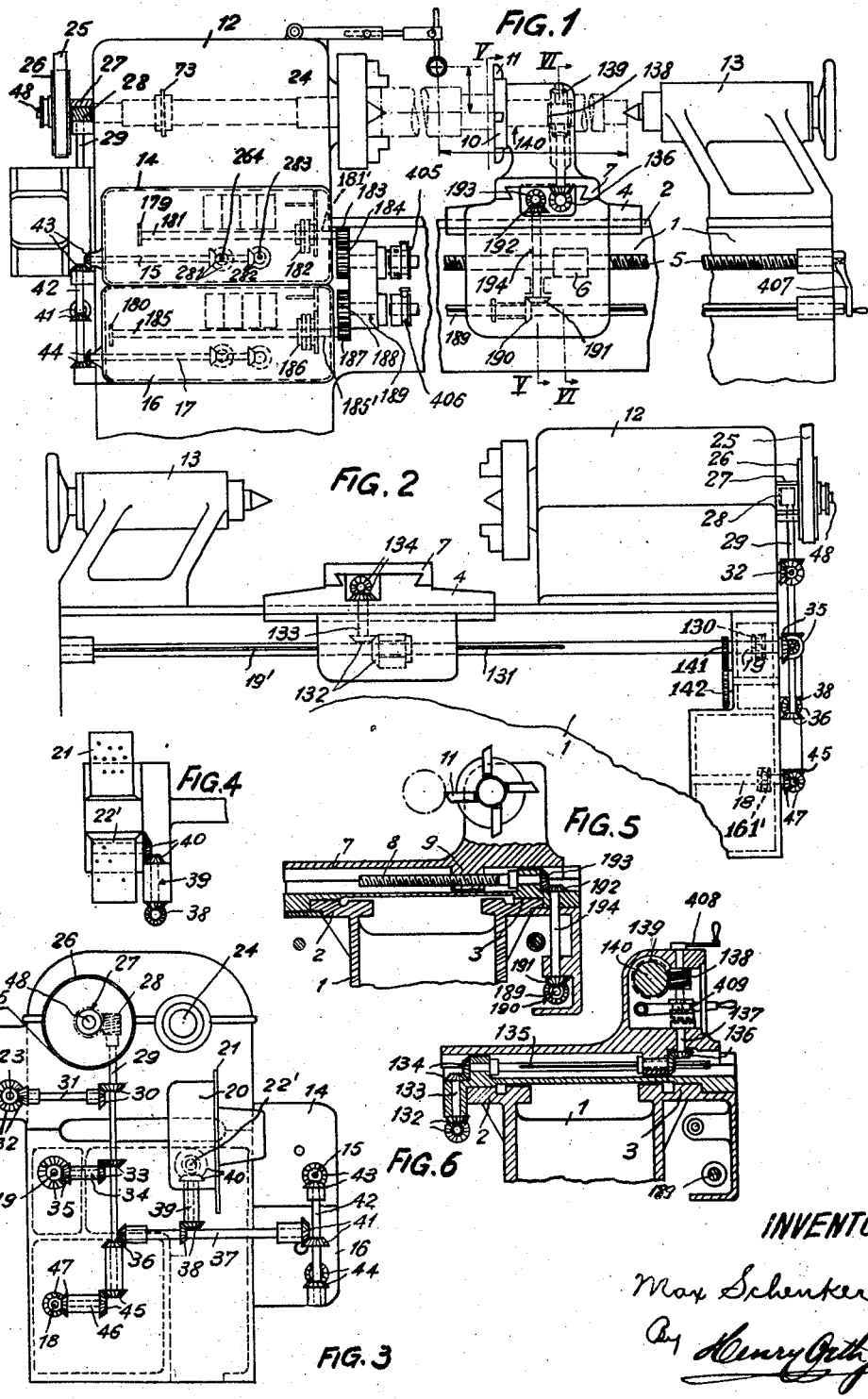

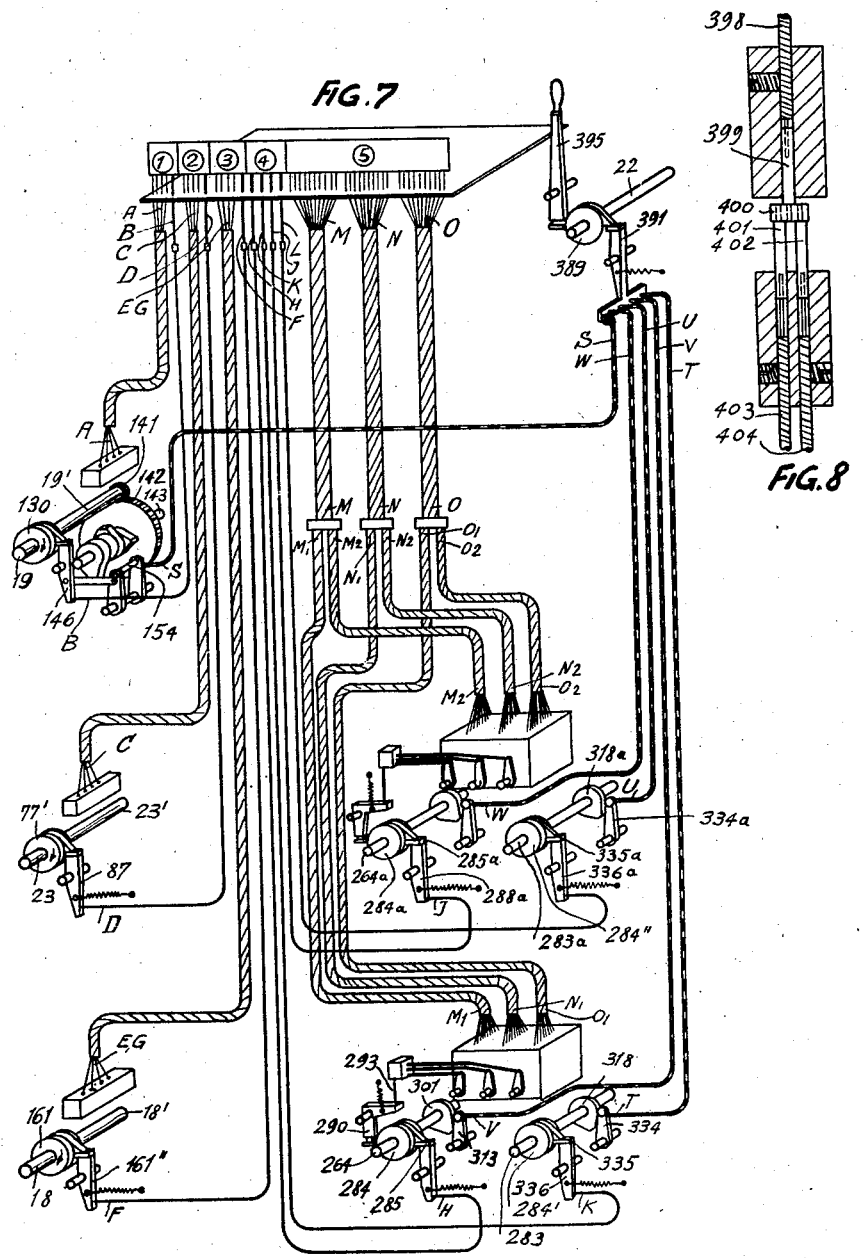

March 15, 1932. M. SCHENKER 1,849,642
METHOD FOR CONTROLLING MOTIONS, PARTICULARLY
IN THE MACHINING OF SOLID MATERIALS
Filed June 18, 1930 13 Sheets-Sheet 3

INVENTOR:
Max Schenker
By Henry Orth
Atty.

March 15, 1932.  M. SCHENKER  1,849,642
METHOD FOR CONTROLLING MOTIONS, PARTICULARLY
IN THE MACHINING OF SOLID MATERIALS
Filed June 18, 1930    13 Sheets-Sheet 4

INVENTOR:
Max Schenker
By Henry Ott
Atty.

March 15, 1932.  M. SCHENKER  1,849,642
METHOD FOR CONTROLLING MOTIONS, PARTICULARLY
IN THE MACHINING OF SOLID MATERIALS
Filed June 18, 1930  13 Sheets-Sheet 5
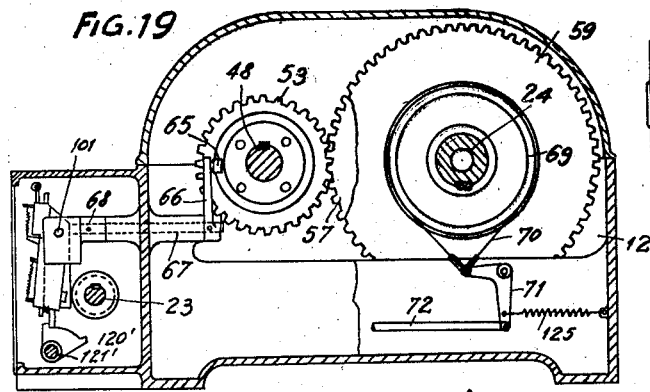
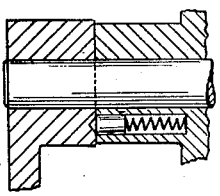
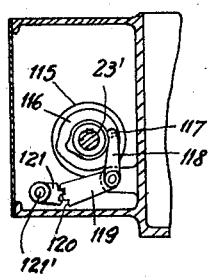
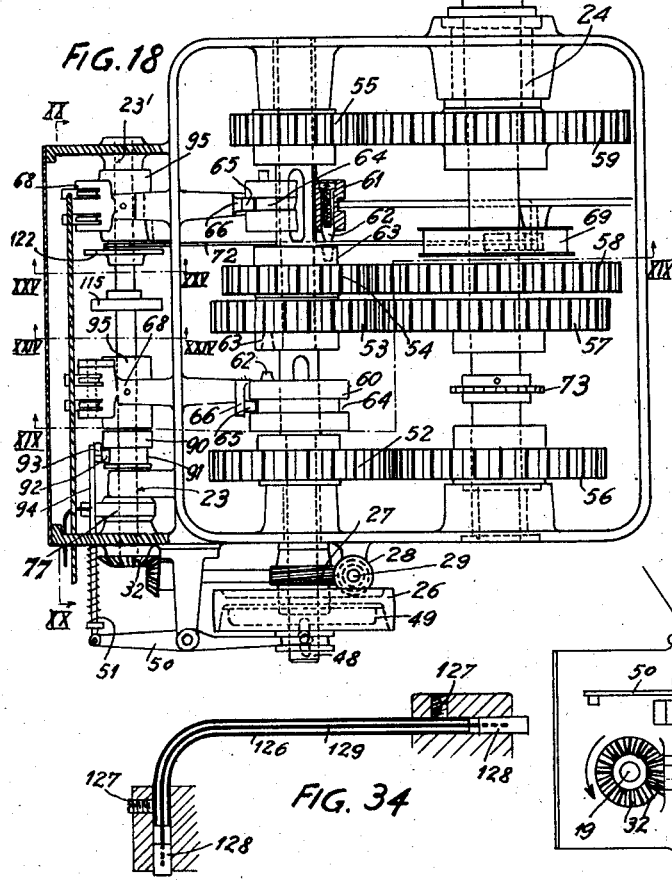
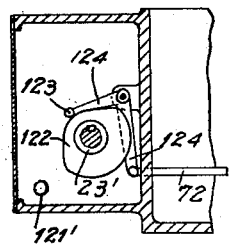
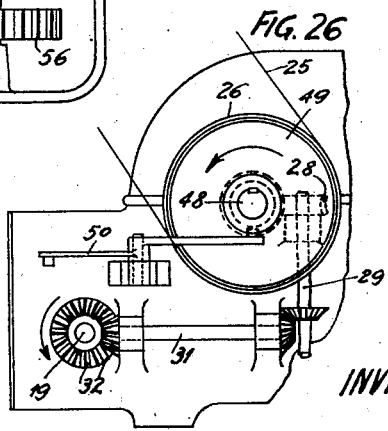

March 15, 1932. M. SCHENKER 1,849,642
METHOD FOR CONTROLLING MOTIONS, PARTICULARLY
IN THE MACHINING OF SOLID MATERIALS
Filed June 18, 1930 13 Sheets-Sheet 6
FIG. 20
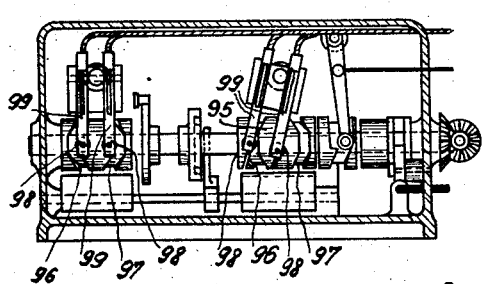
FIG. 21
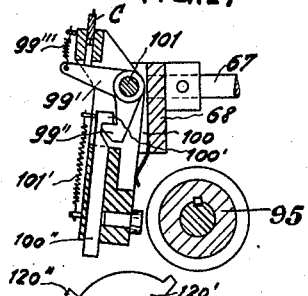
FIG. 29
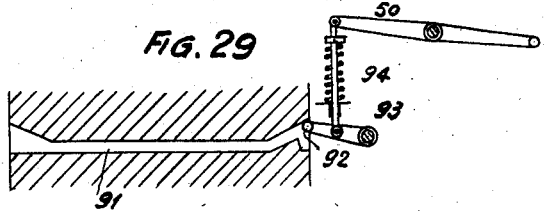
FIG. 22
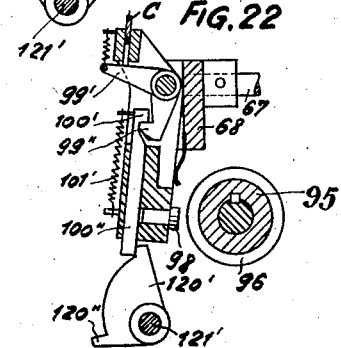
FIG. 30
FIG. 31
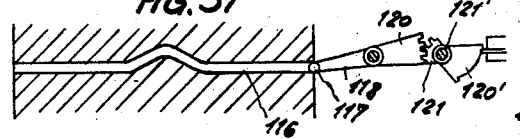
FIG. 23
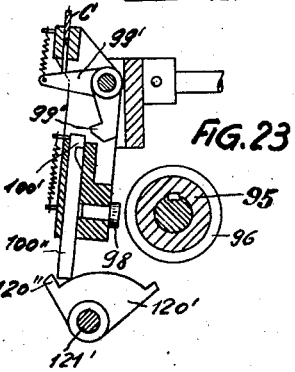
FIG. 32
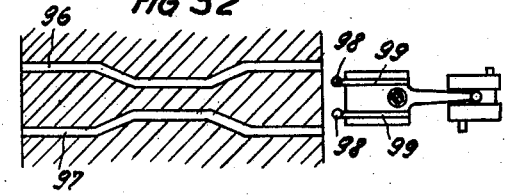
FIG. 24
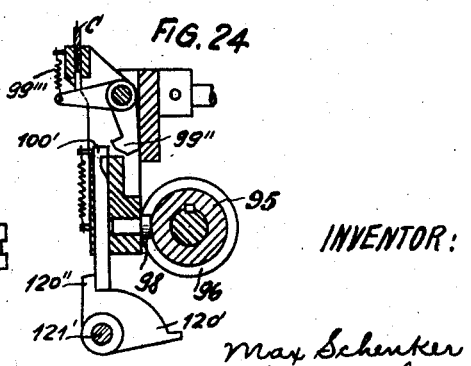
FIG. 33
INVENTOR:
Max Schenker
By Henry Orth
atty.

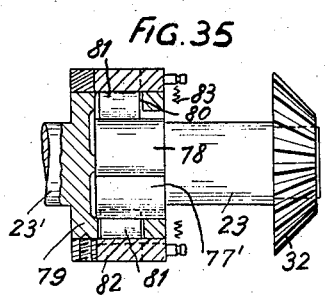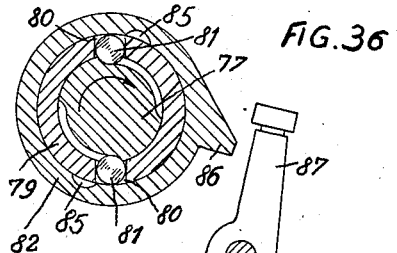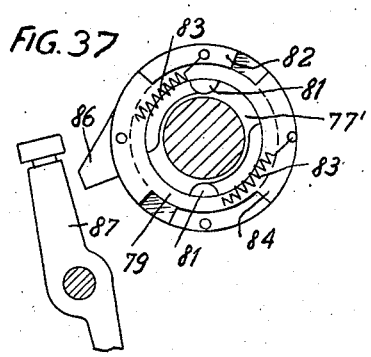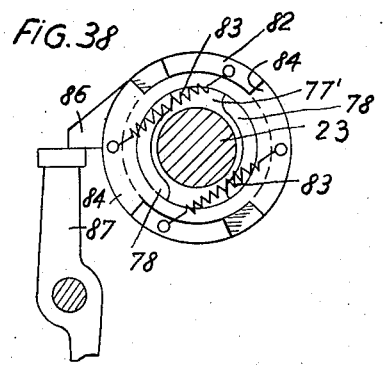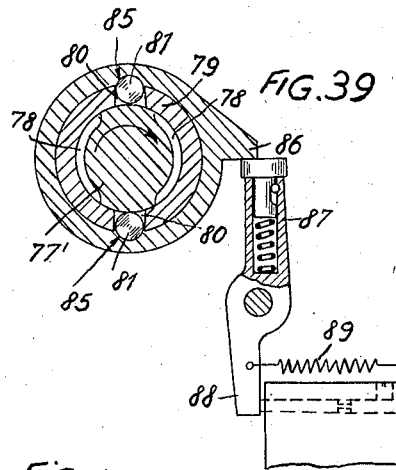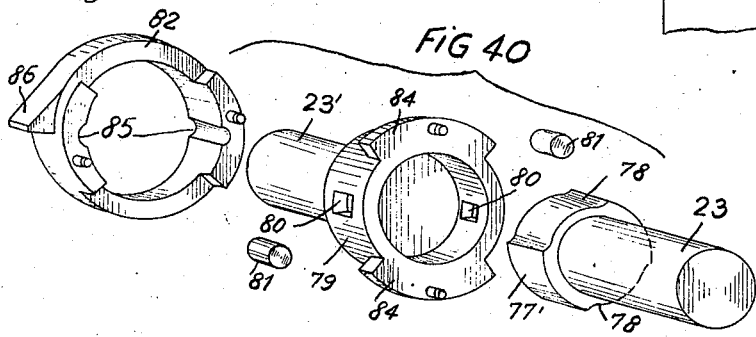

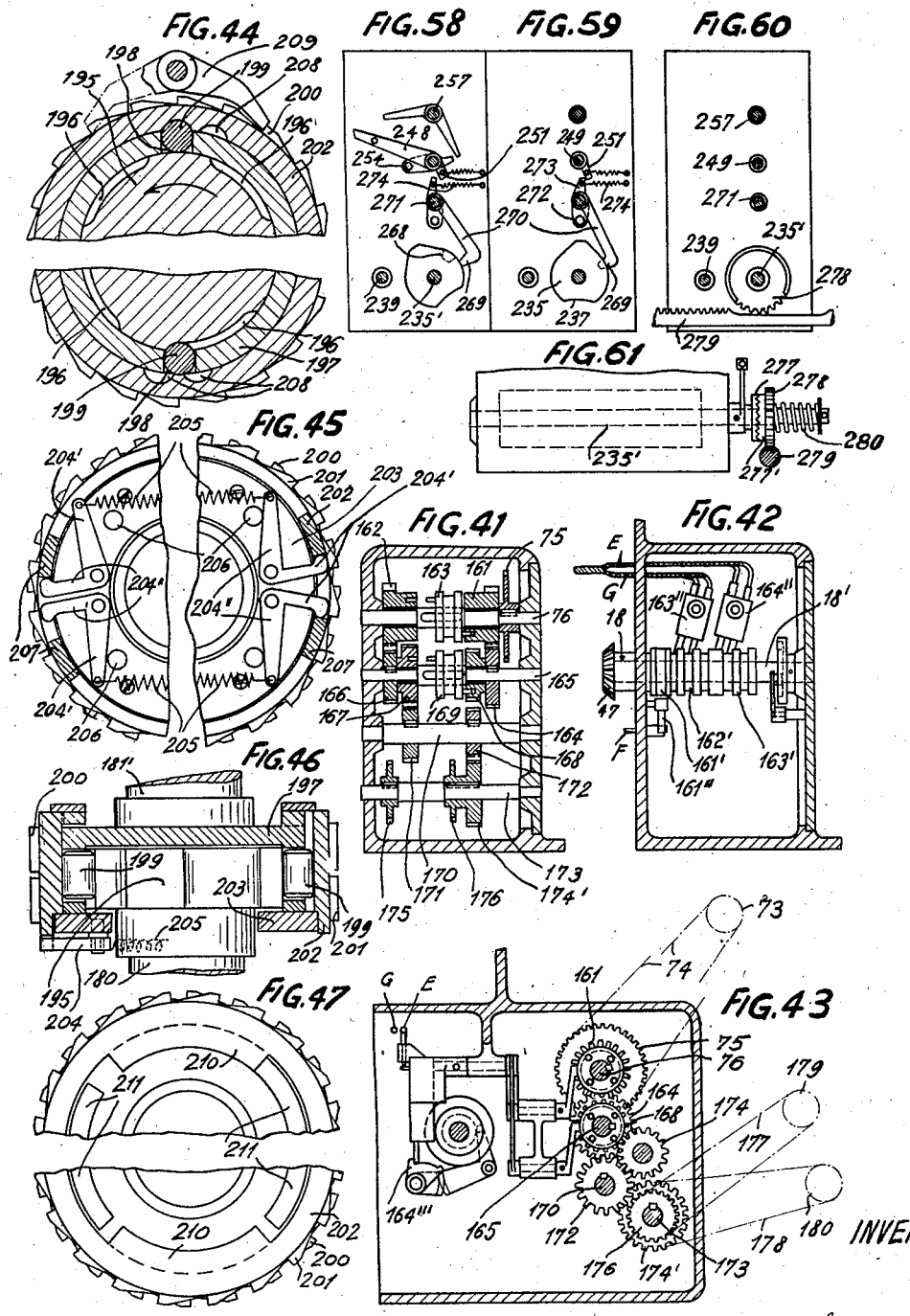

March 15, 1932.  M. SCHENKER  1,849,642
METHOD FOR CONTROLLING MOTIONS, PARTICULARLY
IN THE MACHINING OF SOLID MATERIALS
Filed June 18, 1930   13 Sheets-Sheet 9
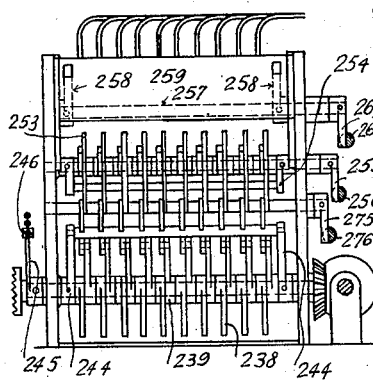
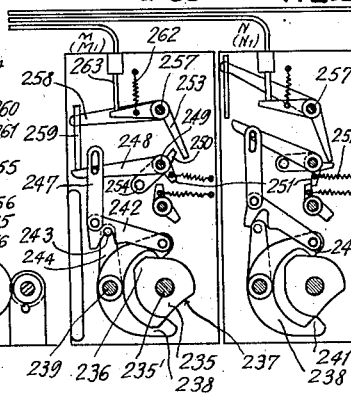
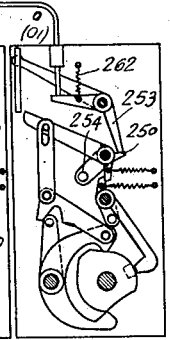
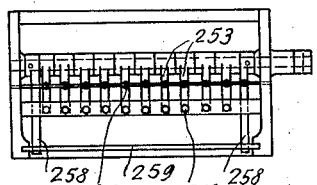
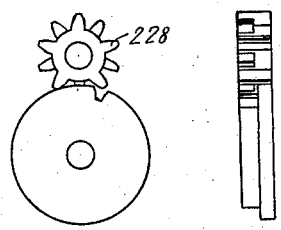
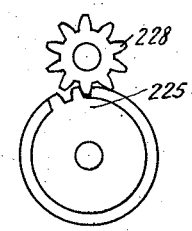
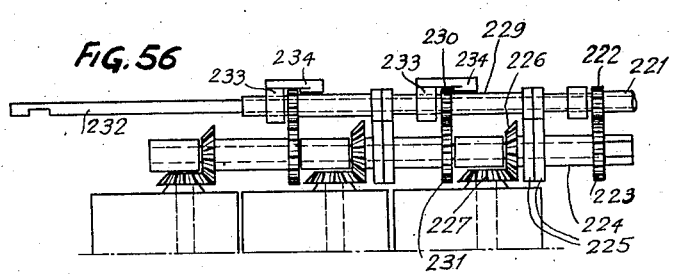
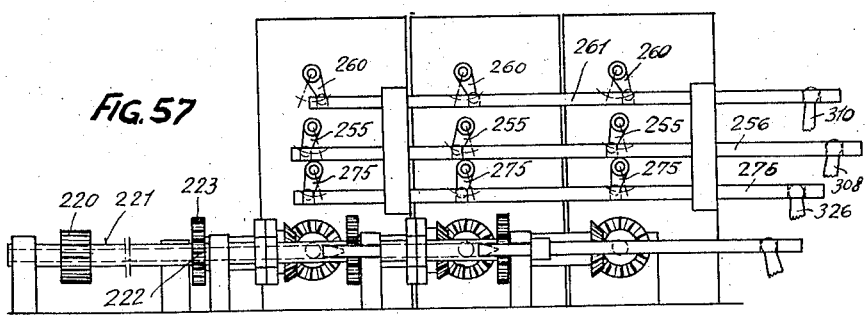
INVENTOR:
Max Schenker
By Henry Orth
Atty

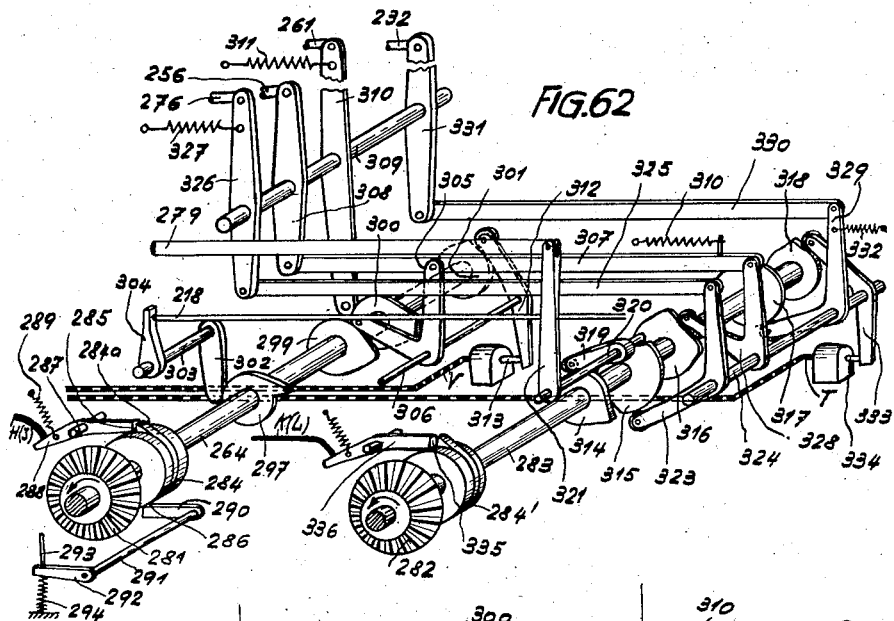

March 15, 1932. M. SCHENKER 1,849,642
METHOD FOR CONTROLLING MOTIONS, PARTICULARLY
IN THE MACHINING OF SOLID MATERIALS
Filed June 18, 1930 13 Sheets-Sheet 11
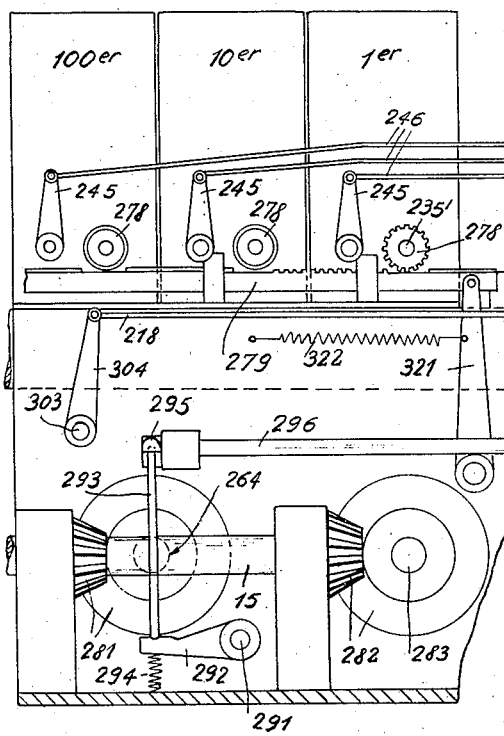
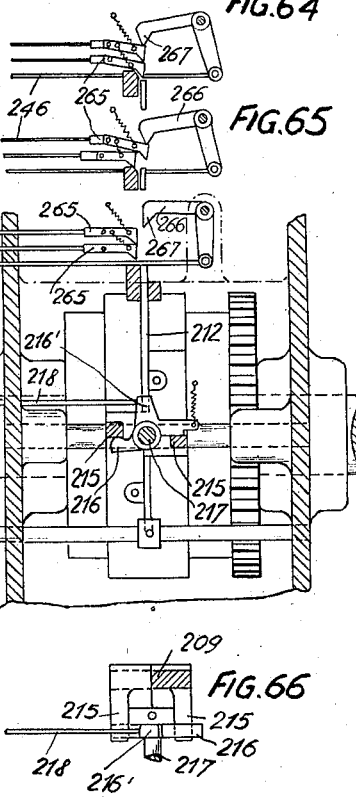
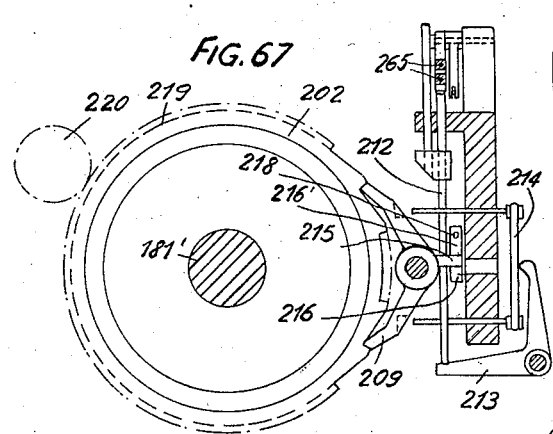
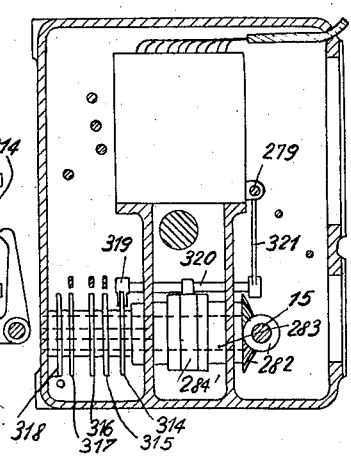
INVENTOR:
Max Schenker,
By Henry Orth Jr.
Atty March 15, 1932.　　　M. SCHENKER　　　1,849,642
METHOD FOR CONTROLLING MOTIONS, PARTICULARLY
IN THE MACHINING OF SOLID MATERIALS
Filed June 18, 1930　　13 Sheets-Sheet 12
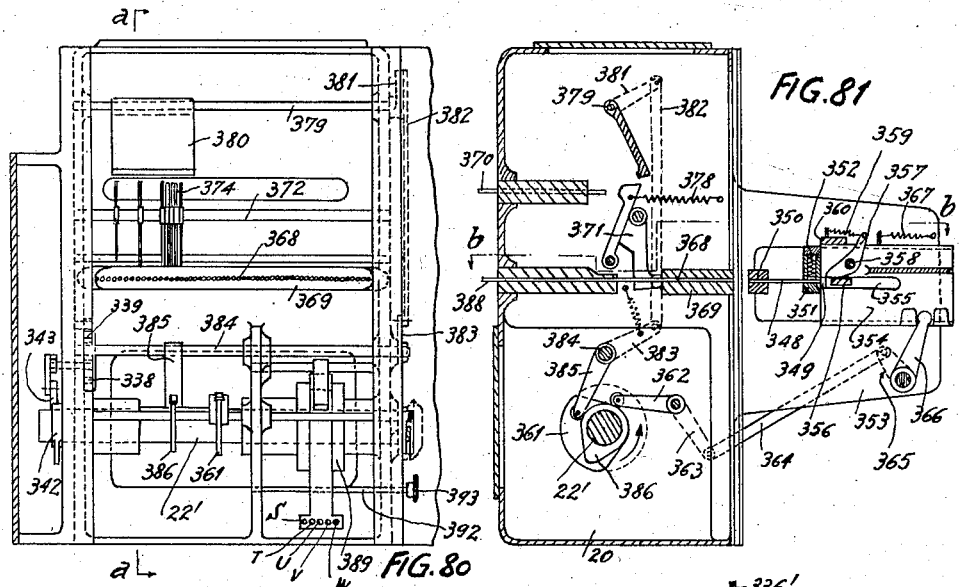
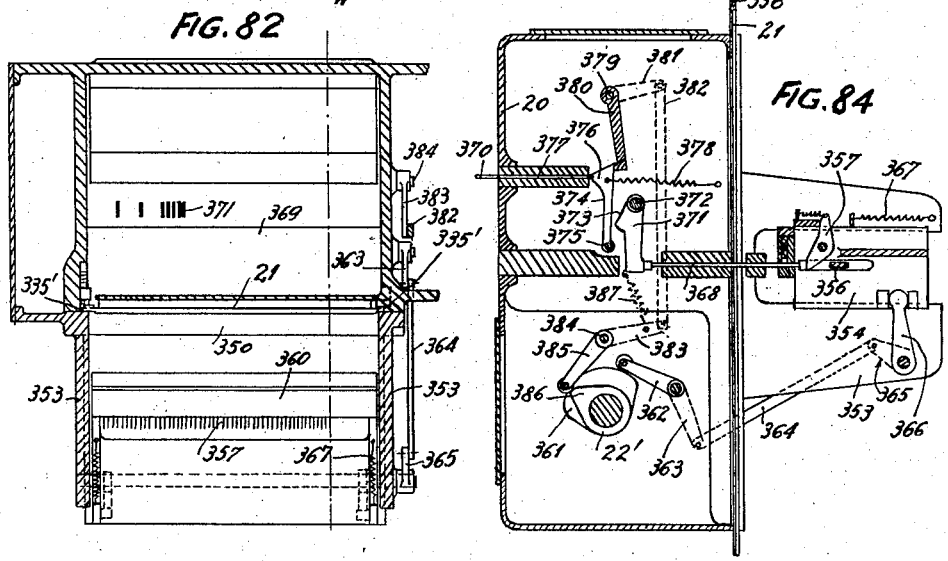
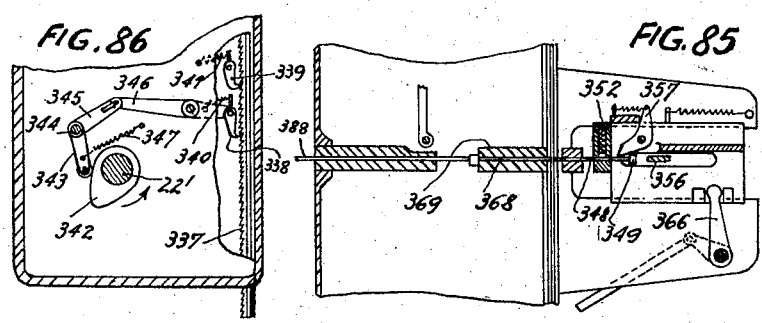
INVENTOR:
Max Schenker
By Henry Orth
Atty.

INVENTOR:
Max Schenker
By Henry Orth
Atty

Patented Mar. 15, 1932

1,849,642

UNITED STATES PATENT OFFICE

MAX SCHENKER, OF SCHONENWERD, SWITZERLAND

METHOD FOR CONTROLLING MOTIONS, PARTICULARLY IN THE MACHINING OF SOLID MATERIALS

Application filed June 18, 1930, Serial No. 462,050, and in Switzerland and Germany June 19, 1929.

Cutting machine tools are known, in which the motions of tool and blank relatively to each other are controlled by a record. In order to control these motions numerically by numbers indicating measurements and to thereby machine the blank to given dimensions, a permanent measuring base has been adopted as fixed point and the tools have been adjusted against said base. To this end the parts of the record which limit the motions, i. e. the beginning and end of every motion, must be in a determined ratio to the magnitude of the motion to be performed. This method shows the disadvantage that the accuracy is very limited as it changed with a wear of the record and that the production of the record is very complicated and expensive.

The subject matter of the present invention is now a method for controlling motions in which the extent of the desired motion is no more dependent on the extent or the shape of the marks present on the record, but is limited by a controlling member, preferably a counter, which may be set to any numbers and which is set in accordance with a number of units of measurement corresponding to the extent of the motion. The setting of the counter to correspond to the number of units of measurement is preferably effected by a record provided with parts causing the controlling action, whereby the position of these parts on the record corresponds to determined measurement numbers. The counter is preferably provided with elements suitable for the used system of measurements, for instance with the decimal system it shows 10 elements each for the hundreds, the tens and the units of measuring units. The arrangement of the parts causing the controlling action on the record is effected in accordance with the same system, for instance a perforation in a determined position of the record corresponds to the number 5 of the units indicating tens of the counter, and so on. If, for instance, a displacement motion of the blank by 400 units of measurement has to be controlled by the record, the latter is provided with a perforation each on the point 4 of the range of hundreds, on the point 0 of the range of tens and on the point 0 of the range of units. The record now influences the counter in such a manner that in the range of hundreds of the latter an element is set at the figure 4 and in the range of tens and of units elements are set at the figure 0 which elements stop the motion as soon as 400 units of measurement have been counted by the counter. In a similar manner any desired motion is determined numerically on the record and controlled by the counter. It may be assumed that the counter has been set to the figure 000 at the beginning of the displacement movement. If, for instance, the tool has to be further displaced by 80 units immediately at the end of the previous displacement movement by 400 units it is not necessary that the counter is set back to 000 and that the measurement 80 is provided on the record; the counter is left at the number 400 reached previously and on the record the number 480 is perforated. The latter is then set on the counter by the action of the record and when the displacement motion starting at 400 has reached the measurement 480 the counter stops the motion.

In this manner it is possible to have any desired motion of a determined extent numerically contained in the record and to limit it by the control member. The subdivision of the counter into fractions of the units of measurement permits to obtain the utmost accuracy of the motions and to check the machined dimensions numerically.

The device for carrying into effect the method according to the invention comprises a counter adapted to be set to any figures and to act upon means for stopping the motion after the latter has reached an extent corresponding to the number set up in the counter, i. e. to the number of units of measurement.

Figure 79:
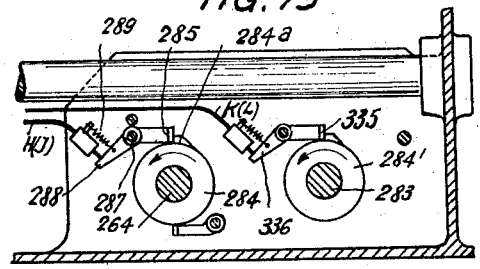
Figure 9:
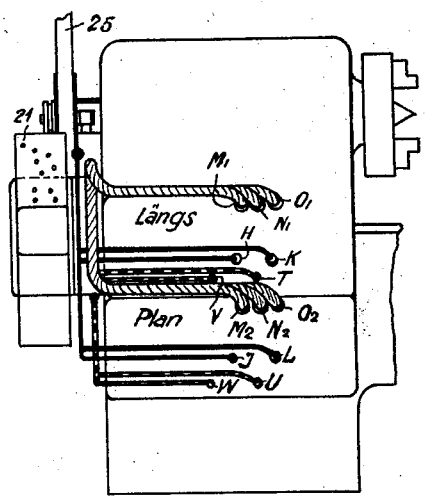
Figure 10:
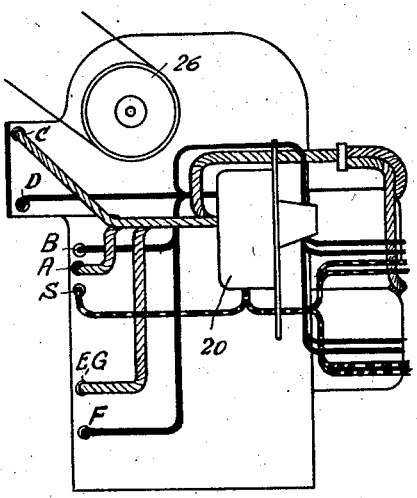
Figure 83:
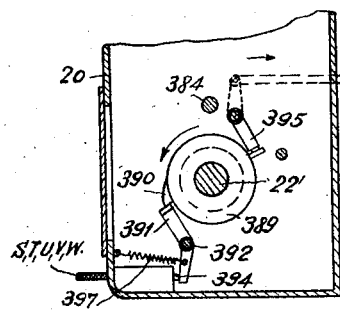
Figure 16:
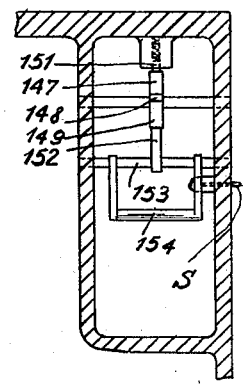
Figure 17:
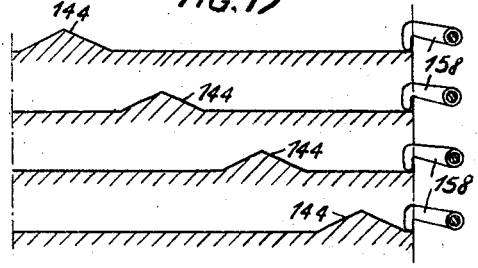
Figure 87:
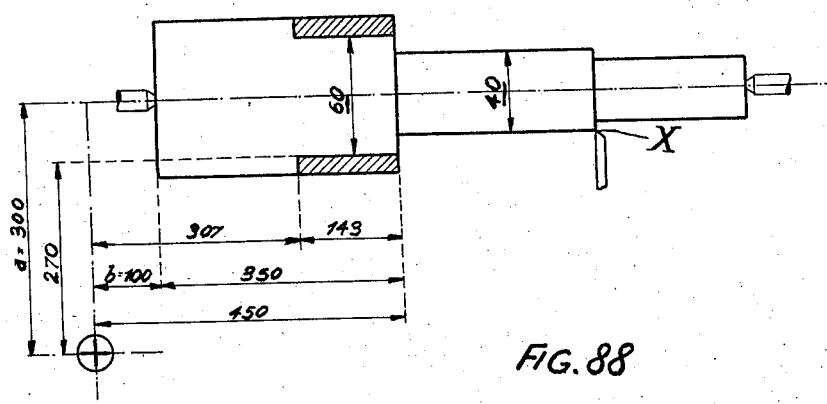
Figure 88:
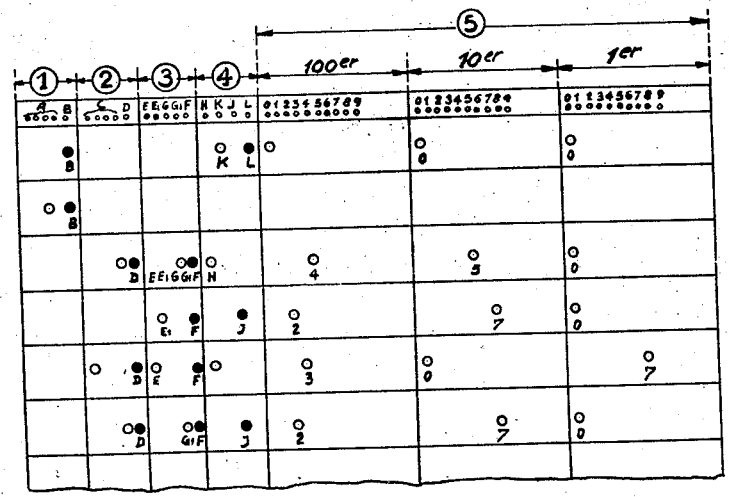

As an example for carrying into practice the method according to the present invention the application of the method to a lathe will now be described, the drawings illustrating a constructional example of the lathe. In the drawings Fig. 1 is a front elevation view of the lathe with parts broken away, Fig. 2 a rear elevation thereof;
Fig. 3 is an end view of the lathe, as seen from the head stock;
Fig. 4 shows a front elevation of the control device operable by means of a record;
Fig. 5 is a vertical section on the line V—V in Fig. 1;
Fig. 6 is a section on the line VI—VI in Fig. 1;
Fig. 7 shows a diagram of the arrangement of the control cables for the main control;
Fig. 8 is a detail of a cable;
Fig. 9 shows in elevation the arrangement of the cables at the head stock;
Fig. 10 shows an end view of the arrangement of the cables;
Figs. 11 to 16 show the casing for the control of the tool turret, with the parts in different operative positions;
Fig. 17 is a schematical development of the control shaft for the control of the tool turret;
Fig. 18 is a plan view of the drive for the head stock together with its correlated control shaft;
Fig. 19 is a vertical section on the line XIX—XIX in Fig. 18;
Fig. 20 is a vertical section on the line XX—XX in Fig. 18;
Figs. 21 to 24 show different operative positions of the control members illustrated in the Figs. 19 and 20;
Fig. 25 is a detail in section;
Fig. 26 shows an end elevation of the drive for the head stock;
Figs. 27 and 28 are vertical sections showing further details of the control shaft;
Figs. 29 to 33 show schematical developments of the grooved disks on the head stock control shaft and members correlated thereto;
Fig. 34 shows a longitudinal section of the connection of a Bowden-cable;
Figs. 35 to 39 are longitudinal and cross sections respectively of a roller coupling, as employed for all control shafts, in various positions;
Fig. 40 is a perspective view of the parts of a roller coupling;
Fig. 41 shows a section of the arrangement of the train of gear wheels of the feed casing;
Fig. 42 shows the control members of the feed casing;
Fig. 43 is a section taken at right angles through the feed casing, as compared with that shown in Fig. 41, illustrating the gearings;
Figs. 44 to 47 are sections and views respectively of the roller coupling operable in both directions of rotation;
Fig. 48 is an elevation of the elements of one decimal group of the counting train;
Fig. 49 is a top plan view to Fig. 48;

Figs. 50, 51 and 52 show the elements of the counting train in three different positions;
Figs. 53–55 show details of the gears of the mechanism for transferring the tens;
Fig. 56 shows a plan view of the feed drive and the mechanism for transferring the tens of the counting train;
Fig. 57 is an elevation of Fig. 56 showing the control levers;
Figs. 58 to 61 are front and side elevations respectively of means for adjusting the digits of the counting train without influencing the tool motions;
Fig. 62 is a perspective view of the two control shafts of a counting train including the correlated cam disks and the elements cooperating therewith;
Fig. 63 shows details for connecting and disconnecting the counting train, on a larger scale;
Figs. 64 to 65 show disconnecting elements in various operative positions;
Fig. 66 shows a plan view of the connecting element;
Fig. 67 is a side elevation of Fig. 63;
Fig. 68 is a section of the counting train;
Figs. 69 to 72 show schematical developments of the cam disks and members cooperating therewith on a control shaft of the counting train;
Figs. 73 to 77 show in similar manner the corresponding parts of a control shaft for parallel adjustment;
Fig. 78 is a further section through the counting train;
Fig. 79 shows an elevation of the roller couplings and actuating members thereof on both control shafts of the counting train;
Fig. 80 shows an elevation of the control device with the record and the stamp beam removed;
Fig. 81 is a vertical section through the control device on the line a—a in Fig. 80;
Fig. 82 is a horizontal section through the control device on the line b—b in Fig. 81;
Fig. 83 is a detail of Fig. 80;
Fig. 84 is a vertical section corresponding to Fig. 81, with the elements in a different operative position;
Fig. 85 shows a further operative position of elements, shown in Fig. 84;
Fig. 86 is a vertical section of the elements for the actuation of the record;
Fig. 87 is a work piece to be turned, and
Fig. 88 shows the record required for turning the work piece, shown in Fig. 87.

The lathe shown in the Figs. 1 to 6 is provided with the usual bed 1 comprising two slide ribs 2 and 3 along which the carriage 4 is displaceable by means of the lead screw 5 and the nut 6. On the bed slide 4 a cross slide 7 is displaceable by means of a screw spindle 8 mounted in the bed slide and a nut 9 (Fig. 5). On the cross slide 7 a tool turret 10 for holding four tools 11 is provided. On the bed 1 is further mounted the head stock 12 and on the slide ribs 2 and 3 the tail stock 13 is slidable. Besides, the bed 1 of the lathe is provided with a control device housed in a casing 14 for controlling the longitudinal movement, i. e. the movement of the bed slide by the intermediary of the control shaft 15 (Fig. 1), as well as a control device housed in the casing 16 for controlling the facing movement i. e. the movement of the cross slide by the intermediary of control shaft 17. Furthermore, a control device for the feed is accommodated in the supporting member of the bed below the head stock comprising the control shaft 18 (Figs. 2 and 3) and directly above a control device comprising the control shaft 19 for the rotational adjustment of the tool turret 10 is mounted (Fig. 2). Moreover, at the head stock end of the bed a casing 20 is provided which contains the main control device actuated by the record 21 (Figs. 3 and 4) and comprising the control shaft 22. In the casing of the head stock a control shaft 23 (Fig. 3) is mounted by which the different speeds of the spindle 24 are controlled.

The drive of the above-mentioned control shafts is derived from the main drive of the lathe. The main drive is constructed as a single pulley drive and actuated by a belt 25 which passes over the driving pulley 26 (Figs. 1 and 18). The latter imparts the drive to the entity of control shafts and for this purpose to the pulley 26 a spiral gear 27 is connected which meshes with a spiral gear 28 on a vertical shaft 29 (Figs. 1 and 3). From the latter motion is imparted by means of the pair of bevel gears 30, shaft 31 and the pair of bevel gears 32 to the control shaft 23 of the head stock, further, by way of the pair of bevel gears 33, horizontal shaft 34 and the pair of bevel gears 35 to the control shaft 19 for adjusting the tool turret (Figs. 3 and 14), and by way of the pair of bevel gears 36, horizontal shaft 37, the pair of bevel gears 38, vertical shaft 39, and the pair of bevel gears 40 to the control shaft 22' of the main control device (Figs. 3 and 4). The horizontal shaft 37 further actuates by means of the pair of bevel gears 41 the vertical shaft 42 and from the latter motion is imparted to the control shaft 15 of the control device for the longitudinal movement via the pair of bevel gears 43 and via the pair of bevel gears 44 to the control shaft 17 of the control device for the facing movement. Furthermore, from the vertical shaft 29 by means of the pair of bevel gears 45, horizontal shaft 46 and the pair of bevel gears 47 the control shaft 18 for the feed motion is actuated. All the aforesaid control shafts run continuously together with the drive.

In order to enable the spindle 24 being turned at different speeds the head stock is constructed as follows (Figs. 18 and 19).

A friction coupling is arranged to cooperate with the driving pulley 26, freely mounted on the transmission shaft 48, the part 49 of the said coupling being shiftable on the shaft 48 but not turnable relatively thereto and pressed against the pulley 26 by action of a spring 51 by the intermediary of a lever 50. On the transmission shaft 48 the spur gears 52, 53, 54 and 55 are freely turnable which continuously interengage with the spur gears 56, 57, 58 and 59 respectively keyed to the spindle 24 of the lathe. The diameters of the spur gears 52 to 59 are so chosen that four different ratios of gearing i. e. four different speeds for the spindle are obtainable.

Between the spur gear wheels 52 and 53 and also between the wheels 54 and 55 a pin coupling member 60 and 61 respectively splined on the transmission shaft 48 so as to be slidable thereon is provided. Each coupling member comprises a number of spring pressed axial pins 62 which project on both sides of the coupling member and the side faces adjacent the respective coupling members 1 of the hubs of the spur gear wheels 52 to 55 are provided with a number of conical bores 63 for receiving the pins 62 when the coupling member is moved towards the respective wheel. For effecting this displacement the coupling members are provided with an annular groove 64 in which a roller 65 (Fig. 19) of a lever 66 engages. The latter is keyed to a horizontal shaft 67 to the other end of which a lever 68 is fixed. The levers 68 are actuated for connecting the respective coupling members 60, 61 from the control shaft 23 in a manner to be hereinafter described. From the said shaft, further, a band brake carried on the spindle 24 and including a brake drum 69 and a brake band 70 is actuated by a bell crank lever 71 and a connecting rod 72 (Fig. 19). On the spindle 24 also a chain wheel 73 for driving the transmission shaft 76 of the control device for the feed by means of a chain wheel 75 and a chain 74 (Fig. 43) is provided, so as to obtain a feed motion which is a direct function of the speed of the spindle.

The control shaft of the head stock consists of two parts, the continuously moving short part 23 to which the bevel gear 32 is fixed and the longer part 23', the two parts being interconnected by a coupling 77 adapted to be locked by means of rollers (Figs. 35 to 40). The said coupling includes a collar 77' fixed on the shaft 23 and provided on its circumference with two diametrically opposed recesses 78 each of which extending through an angle at the centre of a little more than 90°. The collar 77' is enclosed by a ring 79 which is fixed on the shaft 23' (Figs. 35 and 36). The ring 79 is provided with two opposite slots 80 in which rollers 81 are mounted. On the ring 79 a further ring 82 is mounted which is adapted by action of springs 83 to shift relatively to the ring 79 somewhat more than the diameter of the rollers. The shifting movement is limited by two dogs 84 on the ring 79 engaging in recesses in the ring 82. The ring 82 is formed with two grooves 85 which provide accommodation for one half of the rollers. From the exterior circumference of the ring 82 a nose 86 is projecting which is adapted to hit on a locking pawl 87. The position of the pawl is influenced from the record by way of the main control device in a manner hereinafter described.

In Fig. 39 the coupling is shown to be disconnected, as by the nose 86 resting on the locking pawl 87 the ring 82 is held relatively to ring 79 so that the groove 85 matches with the slot 80 and the rollers 81 are urged into this outermost position by the ascending portion of the recess 78 of the rotating collar 77''.

When the locking pawl 87 is rocked from the main control device the ring 82 is shifted relatively to the ring 79 to the position shown in Fig. 36 by action of the springs 83. The roller 81 then acts as a jamming member between the ring 79 and the collar 77, thus coupling the said parts and consequently also the parts 23 and 23' of the control shaft.

All the control shafts are provided with a coupling constructed to be locked in this manner by means of rollers. When from the main control device by the Bowden cable D (Figs. 39 and 7) a short thrust impulse is transmitted to the arm 88 of the locking pawl 87, whereby the latter is rocked into its position shown in Fig. 36, the coupling is connected and caused to rotate. Under the force of the spring 89 the locking pawl 87 after the nose 86 has passed by the same reassumes its locking position shown in Fig. 39. After the control shaft has moved through an angle of 360° the nose 86 again hits on the locking pawl whereupon the coupling is disconnected.

Alternately, more than one nose 86 may be provided on the coupling if only a part-turn is to be effected or for this purpose several locking pawls may be arranged.

The part 23' of the control shaft is further provided with a cam disk 90 having a guide groove 91 (Figs. 18 and 29). In the latter a roller 92 on a lever 93 engages which by means of the rod 94 and the lever 50 automatically connects and disconnects the friction coupling 49.

For shifting the pin coupling members 60 and 61 respectively a cam drum 95 is provided for each of the same. Each cam drum 95 is formed with two guide grooves 96 and 97 (Figs. 32 and 33) for cooperation with rollers 98. The latter are carried by flat coupling actuating elements 99 which are inserted in grooves 100 of the lever 68 and pivoted therein on pins 101.

In the Figs. 21 to 24 the coupling actuating elements 99 are shown in different operative positions. In a slot of each coupling actuating element 99 a pawl carrier 99' is pivotally arranged on the hinge pin 101 of the former the nose 99'' of the said pawl carrier cooperating with a corresponding nose 100' of a catch bolt 100'' which is longitudinally slidable in the coupling actuating element. A spring 101' tends to pull the catch bolt upwardly, whilst a spring 99''' urges the nose 99'' on the nose 100'.

In the inoperative condition the parts assume their respective positions, as shown in Fig. 21, wherein the catch bolt 100 is suspended from the pawl carrier 99' with its lower end outside of the path of travel of the oscillating rocker 120'. When a certain speed is to be provided, i. e. when a certain pin coupling member 60 or 61 respectively is to be connected the respective Bowden cable C presses on the correlated pawl carrier 99' and turns the same into the position shown in the Figs. 23 and 24, whereby by action of the spring 101' the catch bolt 100' is depressed until its lower end bears on the nose 120'' of the rocker. On the succeeding oscillating movement the rocker turns the coupling actuating element 99 round the pivot 101 in the position shown in Fig. 24, whereby the roller 98 enters the respective guide groove 96 or 97 thus effecting the above-described shifting movement of the pin coupling member 60 or 61 respectively. When another speed of the head stock is desired, at first, the connected speed is destroyed, i. e. the control shaft 23' caused to effect by cam disk 116 (Fig. 31) a movement of the rocker 120' into the position shown in Fig. 22, whereby the active coupling actuating members are disconnected and all the catch bolts 100'' pressed upwardly to be arrested. For effecting a further desired speed the respective Bowden cable causes the depression of the corresponding catch bolt, whereupon the described operating incidences are repeated.

The part 23' of the control shaft carries also a grooved disk 115 having a guide groove 116 (Figs. 18, 27 and 31) with which a roller 117 on an arm 118 of a knee lever cooperates. The other arm 119 of the knee lever is provided with a toothed segment 120 which engages with a segment 121 on the shaft 121' of the rocker 120'. During each revolution of the part 23' of the shaft the rocker 120' is turned through a certain angle and the aforesaid effect on the catch bolts 100'' of the coupling actuating elements 99 exerted.

To the part 23' of the control shaft a cam disk 122 is keyed which cooperates with a roller 123 of the bell crank lever 124 which by means of the rod 72 actuates the band brake 69, 70. A spring 125 (Fig. 19) releases the brake band 70.

When it is desired to change the motion of the spindle from one speed to another, at first, as will be seen in the diagrams Figs. 29–31, the part of the friction coupling 49 is disconnected due to the angular dispositions of the different cam disks on the part 23′ of the control shaft, whereupon the band brake 69, 70 is actuated and then the pin coupling members 60 and 61 are put out by action of the guide grooves 96, 97 and the coupling actuating members 99 are raised clear of the guide grooves 96, 97 by the rocker 120′ and simultaneously the operative catch bolt 100 secured in position. The catch bolt 100 corresponding to the new speed is released by the respective Bowden cable so as to be moved out of its locked position, whereupon it is dropped into the path of the rocker 120′ and, on further rotation of the control shaft the pin coupling member 60 or 61 respectively, as selected by the catch bolt is put in. Thereupon the part 49 of the friction coupling is connected and the spindle 24 caused to move with the desired new speed.

In Fig. 34 a part of the Bowden cable is schematically illustrated for showing the standard construction of the connection of the said cable. The cable covering 126 is clampingly connected in a bore by set screws 127 and the push wire provided on both ends with sleeves or studs 128 is freely shiftable with respect to the covering 126.

Between the continuously driven part 19 of the control shaft for effecting the turning motion of the tool turret and the part 19′ of the control shaft a coupling 130 adapted to be locked by means of rollers is intercalated the construction of which corresponds exactly to the previously described one in connection with Figs. 35 to 40. The rotational movement of the shaft part 19′ which is formed with a longitudinal groove 131 (Fig. 2) for securing the parts in their interengaged positions during the shifting of the bed slide is delivered by means of the pair of bevel gears 132 (Fig. 6), vertical shaft 133, the pair of bevel gears 134 mounted on the carriage, horizontal spline shaft 135, the pair of bevel gears 136 mounted in the cross slide, vertical shaft 137, worm 138 and worm wheel 139. The worm wheel 139 is carried on the shaft 140 of the tool turret (Figs. 1 and 6).

The means for controlling the rotational adjustment of the tool turret are shown in the Figs. 11 to 17.

To the part 19′ of the control shaft a spur gear 141 is fixed which meshes with a spur gear 142 on the cam shaft 143 (Figs. 13, 14) to reduce the speed of the latter in the ratio of 1:4. On the cam shaft 143 four cams 144 are disposed in positions which are displaced 90° relatively to each other, such as indicated in Fig. 17 in developed condition, and which correspond to the four tools similarly disposed to each other.

Figure 11:
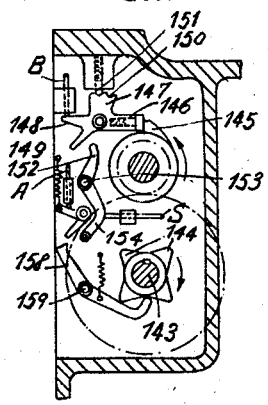

With the nose 145 of the coupling 130 a locking pawl 146 cooperates for effecting the putting in or out of the said coupling in the previously described manner. This pawl is provided with three arms 147, 148 and 149, the arm 147 being formed with two notches 150 in which a spring pressed pin 151 for arresting the locking pawl is adapted to engage in two positions of the latter. The arm 148 is acted upon by thrust impulses imparted thereto from the main control device by means of the cable B and the arm 149 cooperates with a lever 152 to the pivot pin 153 of which a stirrup 154 is fixed (Figs. 11 and 16). On a shaft 155 four knee levers 156 are arranged which are influenced by springs 157 and which are each acted upon by a cable A extending thereto from the main control device. Four knee levers 158 (Fig. 15) are carried on a shaft 159 and urged against their correlated cam disks 144 by springs 160. To each knee lever 156 and 158 respectively and consequently to each cam 144 a tool of the tool turret is appropriated.

Figure 12:
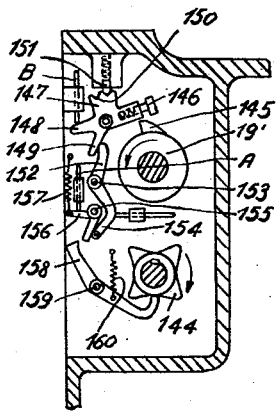
Figure 13:
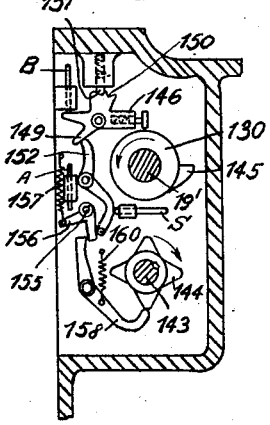
Figure 14:
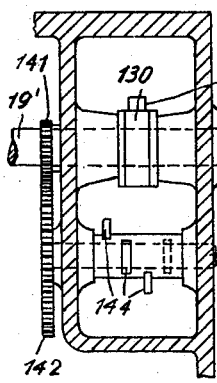
Figure 15:
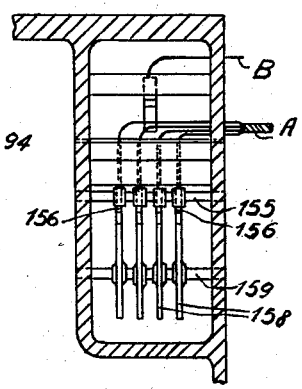

When another tool of the tool turret is intended to be turned in operative position the locking pawl 146 is rotated from the main control device into the position shown in Fig. 12 by successive thrust impulses exerted by the cable B. Simultaneously, the correlated knee lever 156 is moved into the position shown in Fig. 12 by means of the cable A corresponding to the desired tool. The coupling 130 being connected, the shaft part 19′ is turned to cause the rotational displacement of the cam shaft 143 and the tool turret, whereby due to the ratio of gearing between the worm 138 and the worm wheel 139 the tool turret 10 is turned at the same speed as the shaft 143. Thereby the cam portion 144 corresponding to the tool hits on its appropriated knee lever 158 so as to turn the latter into the position shown in Fig. 13. The upper arm of the knee lever 158 presses on the corresponding knee lever 156 and by means of the latter on the stirrup 154, whereby the lever 152 adjusts the locking pawl 146 into the locking position shown in Fig. 13. The rotational movement of the part 19′ of the control shaft keeps on until the nose 145 of the coupling 130 hits on pawl 146; in this moment the respective lever 158 has run clear of the cam portion and the tool is brought into the desired position. If, for instance, the tool corresponding to the fourth cam portion is selected from the record by way of the correlated Bowden cable A the knee levers 158 correlated to the three first tools perform an inoperative rocking motion when acted upon by the respective cam portions and only that knee lever 158 is rendered operative the correlated knee lever 156 of which was adjusted from the main control device by the corresponding cable A.

Thus the part 19' of the control shaft may effect one, two, three or four revolutions, depending on which one of the tools of the tool turret is intended to be turned into operative position, whereby it is accordingly disconnected by the locking pawl 146 and the coupling 130.

During the rocking motion of the stirrup 154 required for disconnecting the coupling 130 at the termination of the desired rotational displacement of the tool turret (Fig. 13) one arm of the stirrup bears on the Bowden cable S to the effect that the record is fed forward by way of the main control device in a manner hereinafter described.

The gearing for effecting the feed is illustrated in Figs. 41 to 43. On the transmission shaft 76 of the control device for the feed motion the gears 161 and 162 (Fig. 41) are loosely mounted and, besides, the pin coupling member 163 is non-rotatably but axially displaceably connected thereto. With the gear 161 the gear 164 is in mesh which is fixed to the intermediary shaft 165 and a wheel 166 also secured to the said shaft meshes with the wheel 162. The intermediary shaft 165 is further provided with two wheels 167 and 168 freely turnable thereon and with a pin coupling member 169 fixed thereto. With the wheel 167 meshes the wheel 171 keyed to the intermediary shaft 170, which latter has a wheel 172 fixed thereto which engages in a wheel 174' secured to the shaft 173. A reversing gear 174 is in mesh with the wheels 168 and 172. On the shaft 173 the two chain wheels 175 and 176 are carried which provide chain drives 177 and 178 respectively in conjunction with chain wheels 179 and 180 (Figs. 1 and 43).

By accordingly connecting the pin coupling members 163 and 169 two different feed speeds in two opposite directions, forward and rearward respectively, are obtainable.

Between the continuously driven part 18 and the part 18' of the feed control shaft a coupling 161' adapted to be locked by means of rollers (Fig. 42) is intercalated which is influenced from the main control device by means of the locking pawl 161" and the Bowden cable F. The connecting of the pin coupling members 163 and 169 is effected upon choice by similar elements, such as cam disks 162', 163' on the control shaft 18', coupling actuating members 163', 164' which are controlled from the main control device by means of the Bowden cables E, G, pawl carrier, rocker 164' (Fig. 43) etc. i. e. by means of similar elements as previously described for effecting the different speeds for the head stock, thus rendering a repeated detailed specification of these elements and their operation superfluous.

The feed motions initiated for the feed by the main control device are transmitted from the chain wheels 179 and 180 (Figs. 1 and 43) to the carriage by the following elements. The chain wheel 179 is carried on a shaft 181 on the one end of which the double roller coupling 182, shown in detail in the Figs. 44 to 47, is mounted. The shaft parts 181', to which the one half of the said coupling is connected, carries a gear 183 which meshes with a gear 184 fixed to the lead screw 5. The actuation of the coupling 182 or the time interval for the movement of the spindle respectively is regulated from the control shaft 15 or the counting train contained in the casing 14 respectively in a manner which will be hereinafter described.

For the transmission of the feed motion to the cross slide the following members are employed:

The chain wheel 180 is fastened to a shaft 185 on which a further double roller coupling 186 which is equal to the coupling 182 in all parts is provided. On the shaft part 185' which carries the one half of the coupling 186 a gear 187 is mounted which engages in a gear 188. The gear 188 is fixed to the grooved shaft 189 (Figs. 1, 5 and 6) on which the bevel gear 190 mounted in the bed slide 4 is axially movable. The drive of the cross slide is effected from the bevel gear 190 by way of the bevel gears 191, 192, 193, shaft 194, and surfacing screw 8. The latter cooperates with the nut 9 of the cross slide. The actuation of the coupling 186 is effected by the control shaft 17 of the surfacing counting train housed in the casing 16.

The double roller coupling illustrated in detail in the Figs. 44–47 is the coupling 182 for connecting the shaft parts 180, 181'. The shaft 181 is provided with an integral collar 195 the circumference of which is formed with four recesses 196. The collar 195 is surrounded by a ring 197 fixed on the shaft part 181' and provided with two diametrically opposed slots 198 in which two rollers 199 are mounted. On the ring 197 a ring 202 is turnably arranged which is formed with two rows of ratchet teeth 200, 201 directed against each other. Further, to the ring 197 a disk 203 is connected to which four knee levers 204 are linked. The one arms 204' of the said knee levers are passed against stop members 206 by means of springs 205, whilst the other arms 204" extend with their end portions between dogs 207 on the ring 202. In the latter recesses 208 (Fig. 44) are provided for receiving the rollers 199 in their inoperative positions, as shown in the upper part of Fig. 44.

When the rollers are urged inwardly, as shown in the lower part of Fig. 44, the parts 195 and 197 and consequently also the shaft parts 181 and 181' are coupled. In this position the knee levers 204 assume their neutral position, as shown in the left half of Fig.

45. On arresting the rotation of the ring 202 by either one of the pawls 209 the collar 195 and the ring 197 keep on running until the roller 199 is disposed above the one or other recess 208 (depending on the direction of rotation). The roller then enters the respective recess, it being displaced by the ascending portion of the recess 196, whereafter the shaft parts 181 and 181' are disconnected. By the relative shifting of the rings 197 and 202 a rotational displacement of the levers 204 from the position shown in the left half of Fig. 45 into the position shown in the right half of Fig. 45 takes place, wherein two diametrically opposed knee levers are moved to clear the stop members 206 by tensioning the springs 205. In order to limit the angular shifting between the rings 202 and 197 when the coupling is disconnected and to avoid that an unintentional re-engagement of the parts takes place the ring 202 is formed with segmental dogs 210 which are adapted to interengage with segmental dogs 211 on the ring 197 in the manner of a dog clutch. In the upper half of Fig. 47 one of the said dogs is shown in operative position, with the coupling disconnected, whilst in the lower half thereof the dogs assume an intermediate position which they take up when the coupling is connected.

The rings 202 are arrested when the double pawls 209 are moved in operative position which is effectuable by means of a trip rod 212 (Figs. 63 and 67) a knee lever 213 and stirrup 214. To disengage the pawls from the ratchet teeth each pawl 209 is provided with a nose 215 for cooperating with a three armed lever 216 turnable about a pivot 217 (Figs. 63, 66, 67). The third arm of the said lever is influenced by a rod 218 for effecting a rocking motion of the lever 216 so as to release the pawls 209.

To the shaft 181' a gear 219 (Fig. 67) is secured which cooperates with a gear 220 fixed to the sleeve 221 (Fig. 57) of the counting train, for example, the counting train for the longitudinal feed. From the gear 220 the indicator drums for the units, tens and hundreds, shown schematically in Fig. 56, are actuated in the following manner: On the sleeve 221 a gear 222 is mounted which meshes with a gear 223 on a sleeve 224. On the sleeve 224 are also fixed a tens-transfer-wheel 225 of known construction which is shown in detail in the Figs. 53 to 55, as well as a bevel gear 226. The latter is in mesh with a bevel gear 227 which is carried on the shaft of the indicator drum for the units. The small pinion 228 for the transfer of the tens is mounted on a sleeve 229 which besides carries a spur gear 230 which interengages with a spur gear 231. The latter is mounted on a sleeve similar to the sleeve 224 which is again provided with a tens-transfer-gearing and a bevel gear for the drive of the indicator drum for the tens. Similar transfer members are interposed between the counter drums for the tens and hundreds and if further counting drums are provided also between those. It will be noted that for other counting systems which deviate from the decimal system, such as for instance the English system, other transfer arrangements than for the tens are employed, whereby the individual groups of the counting train are provided with a correspondingly different number of elements.

In order to enable the individual indicator drums to be reset to zero position or adjusted to exhibit a certain figure the gear drives require to be disengaged which is effectuable by shifting the smaller gears 222, 230 etc. in that the sleeves 221, 229 etc. are axially displaced together with the shaft 232. To maintain the angular disposition of the wheels 230 during this shifting movement guide ribs 234 are secured to the bearing casings 233 for each entering into a tooth space during the shifting (Fig. 56).

Each of the indicator drums is provded for the digits 0 to 9 with ten cam disks 235 which are fixed to the shaft 235' and the raised portions 236 of which are uniformly offset along a helix. Diametrically opposite the raised portions reduced portions 237 (Figs. 50 to 52) are arranged. All the cam disks of the drum for the units have a smaller i. e. a more pointed cam portion (Fig. 52) than the respective cam portions of the other drums (Figs. 50, 51). With each cam disk a double armed rocking lever 238 is associated which is freely turnable on a shaft 239. Both ends of the said lever 238 are provided with a nose the one nose 240 of which cooperates with a cam portion 236, whilst the other nose 241 simultaneously acts on the reduced portion 237. Thereby a positive oscillatory movement of the lever 238 during the rotation of the indicator drums is obtained.

To the upper end of each lever 238 an engagement link 242 ending in a hook is pivotally connected which is adapted to be hooked on the rod 243 which together with the arms 244 forms a stirrup common for all engagement links. The arms 244 are fixed on the shaft 239. On the latter also a lever 245 is fixed to which a rod 246 is linked (Figs. 48 and 63). To the outer end of each engagement link 242 a connecting member 247 having a slot is linked with which a pin of a lever 248 cooperates.

The levers 248 are arranged to be freely turnable on a shaft 249 and each lever is provided with an extension 250 as well as a further extension 251 which is engaged by a spring 252 which tends to press the extension 250 against a knee lever 253. To the shaft 249 is further fixed a stirrup, comprising a bar 254, by means of which all the levers 248 are adapted to be raised. For this purpose at the exterior end of the shaft 249 a lever 255 is mounted to which a rod 256 is linked. The levers 253 are freely turnable on the shaft 257 to which arms 258 are fixed which carry a pusher 259. For the rotational displacement of the shaft 257 a lever 260 (Figs. 48, 57) is provided which cooperates with a rod 261. A spring 262 acts on the lever 253 and holds the latter in contact with the end of a stud 263 of one of the Bowden cables M, N, O.

The counting train for the longitudinal feed (the same applies to the feed motion of the cross slide) is positively driven when motion is imparted to the lead screw. Between the exhibited digits of the counting train and the smallest unit of the feed motion of the lead screw a direct and measurable relation exists. The counting train controls or counts, the number of units of the feed effected due to the motion of the lead screw. In other words if a feed of a predetermined amount is desired the counting train is adjusted to the number corresponding to that amount, so that when this number is reached the counting train automatically disconnects the feed.

The adjustment of the counting train to a number at which the counting train is to interrupt the feed is effected from the main control device. Assuming, that the counting train is to be adjusted to the number 143 the Bowden cables M, N, O are actuated which correspond to the digits 3 of the units group of the counting train, 4 of the tens group and 1 of the hundreds group. When the correlated Bowden cable is actuated it causes the lever 253 to rock until the extension 250 moves clear of the said lever and the lever 248 by means of a pin thereon rests on the end face of the slot in the connecting member 247. At the same time the control shaft 264 (Fig. 62) of the counting train for the longitudinal feed is actuated by the Bowden cable (H, J) and by the said shaft the pusher 259 is pressed downwardly in a manner to be hereinafter described, whereby the hook shaped engagement link 242 associated with the desired digit in each group of the counting train is moved in engagement with the rod 243 of the stirrup. During the rotation of counter drums a rocking motion of the stirrup 243, 244 and thereby of the shaft 239 and the arms 245 is caused by the cam disks of the desired digits. Consequently, the rods 246 and the feed pawls 265 (Fig. 63) linked to their ends, together with the same, are reciprocated and the lever 266 together with its nose 267 is moved up and down. As soon as the desired number is reached the two feed pawls 265 are advanced and shortly afterwards, due to the more pointed shape of the cam portion of the units group of the counting train, the nose 267 of the lever 266 is moved downwardly and by means of the two feed pawls exerts pressure on the previously mentioned trip rod 212 (Figs. 63, 64, 65 and 67), whereby the roller coupling is disconnected and the feed interrupted.

In order to reset the counting train to zero or to adjust it to a predetermined starting number respectively the mechanism shown in the Figs. 58 to 62 is provided which is constructed as follows:

Corresponding to each cam portion 235 of an indicator drum a slot 268 is provided with which the nose 269 of a pawl 270 is adapted to cooperate. All the slots 268 corresponding to the digits are arranged on a spiral line. All the pawls are freely turnable on a shaft 271 to which a stirrup 272 is fixed. The latter enables all the pawls 270 to be raised clear of the slots 268. Each pawl is provided with a further nose 273 which is urged against the extension 251 of the lever 248 by means of the spring 274. When by the adjustment of the counting train to a number in the aforedescribed manner a rocking motion of that lever 248 which corresponds to this number is effected the nose 251 moves away from the nose 273 and the nose 268 of the pawl 270 enters the slot 268 (see Fig. 59) during the rotation of the indicator drum. To the shaft 271 a lever 275 is fixed which is linked to a rod 276 (Figs. 48, 57).

On the shaft 235' of the indicator drum a lost motion coupling 277 (Fig. 61) is carried, the outer part 277' is provided with a toothed portion 278 which cooperates with a rack 279 (Figs. 60, 61). A spring 280 presses the two parts 277 and 277' of the lost motion coupling in engagement with each other and permits the same to slide yieldingly on one another. Fig. 60 shows that in the normal position the gear 278 stands above a portion of the rack 279 which is not toothed. By means of the rack 279 the shaft 235' and the cam disk 235 of the indicator drum together with it are rocked to the extent that the pawls 270 with noses 269 engage in the slots 268 for the purpose of bringing about a certain starting position.

From the previously described control shaft 15 of the counting train for the longitudinal feed (Fig. 1) motion is imparted to the further control shafts 264 and 283 respectively (Figs. 1, 62, 63) by means of pairs of bevel gears 281 and 282 and again in these two control shafts roller couplings 284, 284' of the above-described type are inserted. The roller coupling 284 (Fig. 62) cooperates with its projecting portion 284a with two butts 285 and 286. The butt 285 is provided on a two armed lever 288 which is pivotally mounted on a pin 287 and the one arm of which is acted upon by thrust impulses from a Bowden cable H actuated from the main control device. A spring 289 tends to reset the lever 288 in the position shown in Fig. 62. The butt 286 is provided on a lever 290 which is fixed on a shaft 291. To the letter is further fixed a lever 292 which is influenced by a rod 293 against the action of a spring 294. The rod 293 is acted upon by a lever 295 which is fixed to a shaft 296 (Fig. 63). On the shaft 296 the previously described knee lever 213 (Fig. 67) is carried and during the aforementioned feed motion of the rod 212 which occurs on reaching the adjusted number the actuation of the knee lever 213 is initiated and thereby the rotational displacement of the shaft 296 performed and by way of the parts 290 to 294 the butt 286 moved out of the path of travel of the projection 284a on the coupling.

To the control shaft 264 the cam disks 297, 299, 300 and 301 (Fig. 62) are fixed. With the cam disk 297 a crank arm 302 cooperates which is mounted on a shaft 303 which carries a further lever arm 304 the end of which is acted upon by a rod 218. The cam disk 299 operates the knee lever 305 which is free to turn on a shaft 306. The one arm of the knee lever 305 is linked to the feed rod 307 which in turn is hinged on the lower end of a two armed lever 308. The latter is freely turnable on a shaft 309 and the feed rod 307 is influenced by a spring 310 which holds the knee lever 305 in engagement with the cam disk 299. The upper end of the lever 308 is in cooperation with the rod 256 (Figs. 57, 62).

The cam disk 300 cooperates with the lower arm of a two armed lever 310 which is also free to turn on the shaft 309 and a spring 311 presses the lower end of the lever against the cam disk 300. The upper end of the lever 310 engages the rod 261 (Figs. 57, 62).

The cam disk 301 is in cooperation with the knee lever 312 the lower arm of which is acted upon by the stud 313 of a Bowden cable V extending to the main control device.

On the control shaft 283 the cam disks 314, 315, 316, 317 and 318 (Fig. 62) are carried. The cam disk 314 cooperates with a lever 319 which is mounted on a shaft 320 to which the lever 321 loaded by a spring 322 is fixed the upper end of said lever being linked to a rack 279. The cam disk 315 is in cooperation with the knee lever 323 which is freely turnable on the shaft 324. To the upstanding arm of the knee lever 323 a rod 325 is linked which is connected with the lower arm of a two armed lever 326 which is free to turn on the shaft 309 and which is acted upon by a spring. To the upper end of the lever 326 a rod 276 is pivotally connected (Figs. 57, 62).

The cam disk 316 cooperates with a knee-lever 328 which is also freely mounted on the shaft 324 and the upstanding arm of which is pivoted to the feed rod 307.

The cam disk 317 is acted upon by the one arm of the knee lever 329 the other arm of which is linked to the feed rod 330 which in its turn is pivotally connected to the depending arm of the double armed lever 331. The lever 331 is loose on the shaft 309 and its upper end engages the shaft 232 (Figs. 56, 62). A tension spring 332 holds the knee lever 329 in engagement with the cam disk 317.

The cam disk 318 cooperates with the knee lever 333 which is also mounted on the shaft 324 and the depending arm of which is acted upon by the stud 334 of the Bowden cable T leading to the main control device.

By way of example, it will be assumed that a displacement of the carriage is required to the extent of 143 units of measure. Assuming the feed mechanism to be already adjusted to effect the feed in the desired direction at one of the two possible speeds. The counting train is found to contain any number of the preceding adjustments. Then the counting train is at first set to zero position and this is effected as follows:

The record allocated to the main control device which will be hereinafter described is punched with the numerals 000 and further with a hole for influencing the Bowden cables K (Fig. 62). The Bowden cables M, N, O (Figs. 50 to 52) associated with the numeral 000 exert pressure on the correlated knee levers 253 of the counting train for the longitudinal feed in the manner hereinbefore described and cause the corresponding levers 248 to be disengaged.

During these working incidences the Bowden cable K (Figs. 62, 79) has released the butt 335 which is arranged on the lever 337 and which cooperates with the roller coupling 284' and the control shaft 283 which in this case reinstates the zero position begins to turn. Thereby, in the first place, the cam disk 316 is rendered operative to shift the stirrup 254 to the position shown in Fig. 51 by way of the members 328, 307, 308, 256 and 255. Thus the hook shaped engagement links 242 corresponding to the formerly adjusted number are disengaged from the stirrup 243 and locked. On the further rotation of the control shaft 283 the stirrup 254 is again rocked downwardly and the levers 248 which are associated with the zero digit of each of the three groups of the counting train drop down to release the corresponding nose 273 of each of the respective pawls 270 which bear on the stirrup 272 (Fig. 58). On the continuation of the rotation of the control shaft 283 the cam disk 315 acts on the knee lever 323 and displaces the stirrup 272 by means of the members 325, 326, 276 and 275, whereupon the said stirrup releases the pawls 270 of the zero digits (Figs. 57, 58, 62) to adapt them to engage in the zero slots 268 for the indicator drums. At the same time, as will be seen from the curve diagrams (Figs. 73-77) the cam disk 317 is actuated to displace the shaft 232 by means of the knee lever 329, feed rod 330 and lever 331, whereby the gears 222, 228 and 230 are moved out of mesh. Then the cam disk 314 is actuated to shift the racks 279 by means of the members 319, 320 and 321, whereby the rotation of the indicator drum is effected which permits the pawls 270 to enter the zero slots 268. The thus engaged zero pawl 270 prevents the indicator drum from turning so that on the further shifting movement of the rack 279 the lost motion coupling is rendered operative. In conjunction with the descending portion of the guideway of the cam disk 314 the rack 279 is retracted so that its non-toothed portion is lodged underneath the gear 278. When the rotation of the shaft 283 is continued the gears 222, 228 and 230 are again moved in engagement with their correlated wheels by action of the descending working face of the cam portion 317. Simultaneously, the ascending working face of the cam portion 315 is again rendered operative, whereupon the stirrup 272 is rocked to raise all the pawls inclusive of the zero pawls that were previously operative clear of the drum and to lock the same.

The counting train is set to zero position and is enabled to start measuring the "143" units from this position. Before the projecting portion of the coupling 284' hits again on the butt 335 the cam portion 318 effects a shifting movement the stud 334, whereby the Bowden cable T acts on the main control device to cause the slide to advance one step. At this time the record including the punchings which correspond to the desired number "143" is set in operative position. Out of the said punchings a further punching, particularly for the Bowden cable H (Figs. 79, 62), is rendered operative which causes the butt 285 to be released and the roller coupling 284 as well as the control shaft 264 to rotate until the projection 284a of the coupling hits on the second butt 286.

In the meantime the Bowden cables 263 corresponding to the punchings for the number "143" have rocked the respective three knee levers 253 of the three digit groups of the counting train and released the nose 250 of each lever 248.

During the rotation of the control shaft 264, at first, the cam portion 299 is operative to turn the stirrup 254 by means of the elements 305, 307, 308 and 256, whereby all the engagement links 242 are lifted to clear the stirrup 243 and the engagement links 242 still in operative position from the preceding resetting of the counting train to zero position are each arrested in the raised position by a corresponding nose 250. The back swing of the stirrup 254 is effected by the descending portion of the curve 299, whereby the levers 248 and engagement links 242 corresponding to the adjusted numerals 1, 4 and 3 drop down to move the free ends of the respective levers 258 in the path of the pusher 259.

Thereupon, the cam disk 300 is rendered operative to displace the lever 310, the rod 261 and the lever 260, whereby the pusher 259 is depressed into the position shown in Fig. 50, thus pushing the engagement links corresponding to the adjusted digits, 1, 4 and 3 to engage the rod 243 of the stirrup.

At this time the cam disk 297 is rendered operative to push the rod 218 through the medium of the parts 302 to 304, whereby the previously described turning motion of the three armed lever 216, 216' is effected and consequently the pawls 209 of the double roller coupling are disengaged (Fig. 67). Immediately, the rod 218 by action of the steeply descending cam 297 is reset into its initial position. Shortly afterwards the nose 264a of the coupling 284 hits on the butt 286 thus arresting the control shaft 264.

By disengaging the pawls 209 the part 181' of the feed shaft begins to run, the lead screw 5 is rotated and simultaneously the counting train actuated by the wheels 219 and 220. The indicator drum for the unit values of the counting train is continuously driven, the drum for the tens is actuated by means of the tens-transfer-mechanism and in the same way the drum for the hundreds. As soon as the counting train exhibits the desired number "143" the rod 212 is pushed downwardly (Fig. 64) in the manner hereinbefore described, whereby the pawls 209 engage in the ratchet teeth of the double roller coupling, whereafter the feed motion of the shaft 181' is stopped. At the same time, by rotation of the shaft 296 the rod 292 is depressed, the butt 286 is turned out of its operative position and the control shaft 264 caused to move through a further half revolution until the nose 284a hits on the further butt 285. During this half revolution, by means of the descending portion of the cam 300 the pusher 259 is again lifted and the stud 313 of the Bowden cable V pushed by means of the cam 301 and the knee lever 312, thus causing the main control device to move by a further step. The counting train for the control of the feed of the surfacing slide is provided with exactly the same elements as the counting train for the longitudinal feed motion just described, so that further explanation may be dispensed with. In the diagram shown in Fig. 7 its parts, in distinction to those of the counting train for the longitudinal motion, are provided with the index "d". The said counting train is influenced from the main control device by the Bowden cables J and L and upon the termination of its operation acts on the main control device by means of the Bowden cables U and W.

The main control device which is housed in the casing 20 (Figs. 3, 4) has a guide 335' for a frame 336' in which the record, for example, in the form of perforated sheet of cardboard is inserted. For shifting the frame in the vertical guide a rack 337 is provided (Fig. 86) which cooperates with a feed pawl 338. A locking pawl 339 is arranged for holding the frame in each position of adjustment. The pawls 338 and 339 are influenced by springs 340 and 341. The feed of the cardboard is effected from the control shaft 22' (Figs. 3, 4, 84, 86). For this purpose on the control shaft 22' a cam 342 is provided with which a lever 343 comprising a roller cooperates. The said lever is fixed to the shaft 344 to which a further lever 345 is keyed which is pivotally connected to a double armed lever 346 carrying on its other end a feed pawl 338. A spring 347 presses the roller of the lever 343 against a cam 342.

Corresponding to the number of punchings for the different functions to be controlled by the record obtainable, an adequate number of keys 348 (Fig. 81) in the form of thin bars with a head 349 are provided which are displaceable in a stationary guide 350 and a movable guide 351. Each key bar is acted upon by a spring brake 352 for preventing an unintentional displacement of the bars. In two guide members 353 fixed to the casing 20 the cross-heads 354 of the key beam are guided which is adapted to reciprocate. The key beam is formed with a slot 355 through which extends a stationary stop beam 356. To each key bar a pawl 357 is appropriated, all of which are freely turnable on a shaft 358 and influenced by springs 359. Furthermore, a common stop member 360 is secured to the movable key beam. For reciprocating the key beam a cam disk 361, fixed to the control shaft 22', is arranged which effects the said reciprocating motion during the rotation of the control shaft 22' by means of levers 362, 363, a rod 364, and levers 365 and 366. A spring 367 tends to move the key beam outwardly and thereby to press the lever 362 on to the cam disk 361.

In Fig. 81 the key beam is shown in its extreme exterior position. If from there it is moved inwardly the key bars, by action of the braking spring, are moved together with it so as to meet with the card board. When no perforation is present in the card board beneath a bar the end of the said bar rests on the card board, as shown in Fig. 85, and the bar remains in this position while the key beam moves on causing the pawl 357 to slide along the bar. When, however, the bar meets with a perforation its end portion passes through the same, whilst the pawl 357 during the further movement of the key beam moves behind the stop beam 356 to take up a position above the head of the key bar 348. Thereby the pawl rests on the stop member 360 which prevents the bar from moving backwardly (Fig. 84).

When the key beam continues to move inwardly the inner end of the bar 348 presses on transmission bars 368 which are guided in guides 369 of the casing 20. During the rearward motion of the key beam 354 the pawls 357 are rocked by the stationary stop beam 356, whereby the pawls, which during the inward movement rest on the bars having entered a perforation, perform a greater rotational movement than the pawls of the other bars. The bars are pushed back into the initial position by means of the stationary stop member 356 when the beam has arrived at its outermost position.

At this time all the bars 348 again reassume their initial position shown in Fig. 81. Seven of the bars 368 act on Bowden cables 370 (B, D, F, H, J, K, L Figs. 81, 7) which influence the stops for the roller couplings of the control shafts and effect the connection of the couplings. These stops are the following: 146, 87, 161'', 285, 335, 285a and 335a, which serve for respectively influencing the roller couplings of the control shaft 19, 19' of the tool turret of the control shaft 23, 23' of the head stock of the control shaft 18, 18' of the feed mechanism, of the two control shafts 264, 283 of the counting train for the longitudinal motion, and of the two control shafts 264a, 283a of the counting train for the surfacing operation (Fig. 7). These seven special bars act with their inner ends on levers 371 which are freely turnable on a shaft 372 (Figs. 80, 81, 84) and press by means of bearing surfaces 373 on levers 374 which are freely turnable on a shaft 375 and each provided with a nose 376 for pressing on the stud 377 associated with the respective Bowden cable 370. A spring 378 prevents each nose 376 from engaging with the respective stud 377.

On the shaft 379 turnably mounted in the casing 20 a rocker 380 is fixed which cooperates with the exterior ends of the levers 374 (Figs. 84). On the shaft 379 a lever 381 is carried which is connected to a lever 383, by means of a rod 382, the lever being fixed to a shaft 384. To the latter a further lever 385 is fastened the roller of which cooperates with a cam 386 on the control shaft 22' of the main control device. A spring 387 presses the lever 385 against the cam disk.

The keys that have entered in perforations of the record push the bars 368 inwardly thus rocking the levers 371 and 374 so that the nose 376 hits on the stud 377 and consequently the exterior end of the lever 374 projects in the path of the rocker 380 to be urged against the stud 377 into the position shown in Fig. 84 when the cam 386 turns the lever 385. Thereby the corresponding stop member of the roller coupling of one of the said seven control shafts is cleared and the latter begin to run. Immediately after the passage of the cam 386 the rocker 380 is moved back into its inoperative position, as shown in Fig. 81, and the lever 374 by action of the spring 378 is so far moved back as to rest on the bearing surface of the lever 371 thus enabling the retracted stop member of the roller coupling to return to its locked position by spring action.

The other Bowden cables 388 are directly influenced by the bars 368 and this relates particularly to the Bowden cables (A, C, E, G, M, N, O Fig. 7) which serve for selecting one of the four tools of the tool turret and for connecting the speeds of the head stock and of the feed, as well as the numbers of the two counting trains respectively.

On the control shaft 22′ one of the hereinbefore described roller couplings 389 is carried, which is formed with a stop member 390 (Fig. 83). This stop member cooperates with a double armed locking pawl 391 which is mounted on a shaft 392 which is provided with a button 393 for rocking the shaft by hand. The depending arm of the locking pawl 391 acts on studs 394 of the Bowden cables S, T, U, V, W which on the termination of the actuation of the control shafts for the tool turret and for the two counting trains effect the feed of the record by lifting the locking pawl 391 out of its locked position. Moreover, a check lever 395 is provided which is adapted to be moved in or out of operative position by means of a rod 396. When the check lever 395 is moved into locked position and the locking pawl 391 moved out of its locked position by hand the control shaft 22′ is arrested in a position, whereby the key beam 354 assumes it outermost position and all the keys 348 are lifted off the record so that in this position the key 21 is enabled to be exchanged. The new record is so adjusted that its first row of perforations lies directly underneath the keys 348. The locking pawl 391 is brought to operative position by action of the spring 397 on releasing the button 393 and the check lever 395 is turned by hand in its inoperative position. The control shaft 22′ is turned until the nose 390 of the roller coupling hits on the locking pawl 391. Thereby the key beam was moved inwardly, the corresponding keys have entered the perforations of the record, the rocker 380 was actuated by thrust impulses and thus the control entailed in the row of perforations of the record was transmitted to the corresponding control shafts of the machine. At the end of the said control operation the locking pawl 391 is released by action of thrust impulses by the corresponding Bowden cables S, T, U, V or W, whereby the control shaft performs a full revolution, the key beam moves back into its outermost position and the keys 348 together with it, the cam 342 causes the record to be advanced a line of perforations, the key beam reassumes its innermost position, the keys 348 situated above the perforations enter the new perforations, the rocker 380 is again actuated and the new control is again transmitted to the control shafts. These working incidences are repeated until no more perforations are available in the record, whereupon the machine is stopped.

In the arrangement illustrated the perforations of the record are subdivided into five groups. The first group comprises the four Bowden cables for selecting the four tools as well as the Bowden cable for the actuation of the control shaft of the revolving tool box. The second group comprises four Bowden cables for the four different speeds of the head stock and a cable for influencing the control shaft of the head stock. The third group contains four Bowden cables for the two forward and the two rearward speeds of the feed and the cable for the control shaft for the feed motion. The fourth group includes the four cables for influencing the two control shafts of the counting train for the longitudinal feed and the two control shafts of the counting train for the surfacing feed. The fifth group comprises the cables for transferring the numbers to the counting trains i. e. ten cables for the unit digits, ten cables for the tens digits and ten cables for the hundreds digits. Each number cable is separated into two strands the one of which leads to the counting train for the surfacing feed and the other to the counting train for the longitudinal feed. Fig. 8 illustrates how this separation is effected, the cable 398 being connected with a stud 399 carrying a cross head 400 to which two studs 401 and 402 are fixed which are connected with the cables 403 and 404 respectively. In Fig. 7 the connections of the cables and the card board are schematically illustrated. The thick cables contain the strands for selecting the tools, the speeds of the head stock and the feed of the numerals to be set by the counting train. The thin cables are those which influence the control shafts and the cables shown in dotted lines cause the step by step feed of the card board on the termination of the working incidences as determined by each row of perforations. In the Figs. 9 and 10 the strands are shown in the same disposition as provided in the machine.

Fig. 88 shows a portion of the record i. e. a sheet of card board provided with perforations and Fig. 87 illustrates a simple work piece to be turned, the machining operation for which is controlled by the shown record.

In the first place the carriage and the cross slide are brought manually in such a position that the cutting edge of a tool coincides with the cross-hair which provides a fixed datum mark for the measuring. For effecting this manual adjustment detachable couplings 405, 406 are inserted in the lead screw 5 of the lathe, and in the shaft 189 for the drive of the surfacing slide respectively as shown in Fig. 1 and a hand crank 407 provided which is slid on a square head on the spindle 5 or on the shaft 189 respectively.

Thereupon, the tool turret is also manually turned by means of the crank 408, wherefore a detachable coupling 409 is provided, and then the cutting edges of the other three tools are successively adjusted to coincide with the cross-hair. Thereby it is possible to obtain an accurate machining by any one of the selected tools as the cutting edges of the latter are adjusted to the same point as regards the distance from the axis of rotation and from the fixed datum mark. (On the other hand another work piece may be turned by simply exchanging the record without necessitating the tools to be re-adjusted and as the new record would again be adapted to effect a numerically defined control if the new work piece were to be exactly machined to the prescribed dimensions). Then, at this relative disposition of the two slides the couplings provided for the described manual adjustment are connected and the two counting trains by the aid of the record set to zero position. For this purpose the record has two perforations in column 4 thereof for influencing the two control shafts 285 and 283a of the two counting trains and in the columns for the digits perforations corresponding to the zero positions of the groups for the digits of the counting trains. The coordinates of the fixed datum mark are known and assumed to be: $a = 300$ and $b = 100$. Thus, if on the work piece to be turned illustrated in Fig. 87 the cross-hatched area is to be machined the side tool No. 3 of the tool turret is selected as in the 2nd line of the record in the first column a perforation for the drive of the control shaft 19 of the tool turret is provided, and a perforation which corresponds to the tool No. 3.

In the third line of the record the speed No. 4 of the head stock is selected, the 2nd column of the said line being provided with a perforation D, for the drive of the control shaft of the head stock and besides a further perforation, 4, being present for the desired speed. Furthermore, in the third column for the control shaft of the feed, a hole, F, and for the rearward feed at larger speed a hole, G1, is punched and in the column a hole, H, for the control shaft of the counting train for the longitudinal feed. The thus induced feed for the carriage must take place up to the shoulder of the work piece corresponding to a longitudinal adjustment of $b + 350 = 450$ units of measure. Consequently in the columns of the hundreds, tens and units for the counting train the perforations 4, 5 and 0 are punched.

In the fourth line the inward feed of the cross-slide occurs to the diameter of 60 i. e. a displacement takes place away from the zero position of $300 - 30 = 270$ units. Thus, in the third column the punchings, E1, for the forward feed and, F, for the control shaft of the feed are provided. Besides, J, for the control shaft of the surfacing counting train as well as the digits 2, 7 and 0.

In the fifth line the tool for the detachment of a cutting is longitudinally advanced by 143 units of measure. For this purpose in column 2 the punchings, 1, and D, for slow speed of the head stock, in column 3, E and F, for slow forward feed, in column 4, H, for the control shaft of the counting train for the longitudinal feed, and in column 5 the units for the number $450 - 143 = 307$ are provided.

In the sixth line the outward feed for retracting the tool from the work piece occurs, for instance, back to the starting line 300. Therefore, the following punchings are provided: in the column 2, D and 4, for high speed, then F and G1, J and the digits 2, 7 and 0.

In the fifth line the tool for the detachment of a cutting is longitudinally advanced by 143 units of measure. For this purpose in column 2 the punchings, 1 and D, for slow speed of the head stock, in column 3, E and F, for slow forward feed, in column 4, H, for the control shaft of the counting train for the longitudinal feed, and in column 5 the units for the number $450 - 143 = 307$ are provided.

In the sixth line the outward feed for retracting the tool from the work piece occurs, for instance, back to the starting line 300. Therefore the following punchings are provided: in column 2, D and 4, for high speed, then F and G1, J and the digits 2, 7 and 0.

In similar manner the machining of any piece to be worked can be controlled by a corresponding record, as in any case movements in two directions are involved. The record is automatically fed forward step by step in the manner described above as soon as the control contained in one line is carried into effect.

To avoid reduction of the measurements to the differences of the distances from the datum mark the counting trains may be reset to zero position on the termination of each working operation. When, for instance, it is desired to machine a work piece with milled surfaces once more it will be advantageous not to start from the fixed datum mark for the trimming of the work piece to the required dimensions, but rather to use the fixed datum mark only for the adjustment of the tools. As a starting base for the dimensioning a point of the milled surfaces may be chosen and one of the tools adjusted to this point by manually displacing the cross slide and the carriage and then setting the two counting trains at this point to zero in Fig. 87 preferably the edge X of the shoulder on the diameter 40 were chosen. The zero setting at this point is not necessary if all the measures refer to the same original starting point, in this case with the tool adjusted to the point X the counting trains for the longitudinal and the transverse feeds are adjusted to the known coordinates of point X.

In the afore-described example for the sake of simplicity the assumption was made that the record is provided with three digit groups only, i. e. a group for the units, tens and hundreds respectively and, besides, that the numerals of the units group refer to millimeters, those of the tens and hundreds groups respectively to decimeters. In practice a machine tool, depending on the purpose which it is serving and the accuracy to be obtained therewith, may be equipped with more groups for numeral digits and an adequate number of groups of elements in the counting trains, whereby the last group would correspond to the decimal position of the unit of measure required for the accuracy to be obtained.

The pitch of the lead screw of the lathe and the ratio of gearing for the drives of the counting trains will be accommodated to the unit of measure adopted. By way of example, with 20 teeth on the circumference of the double roller coupling, a pitch of 2 cm. of the lead screw, a ratio of gearing of 2:1 between the coupling and the drive of the units group of the counting train for the longitudinal feed, the digits of the units would refer to millimeters. Suitably in the gearing for the drive of the surfacing screw a reduction of 1:2 may be inserted so that the surfacing counting train would expose directly the measure of the diameters and a recalculation to the measure of the radii, as indicated in Fig. 87 were eliminated. Accordingly, in the record the values for the diameters would show up.

In the above the working operation for the numerical determination of the necessary adjustments of the tools with the aid of counting trains was described in conjunction with a lathe. The same principle of control by means of counting trains may be applied to any machine tool and broadly to every machine involving shifting movements. It is also possible without anything further to control a rotational displacement about a starting point, whereby instead of right-angled coordinates polar coordinates are provided for in the counting trains.

Alternatively the counting trains may be arranged to afford manual adjustment for the limitation of movements whilst the initiation of the movements in itself may be effected by the record or by hand respectively, for instance, by depressing the key bars. In this manner a semi-automatical control of the machine is obtained, whereby the counting train determines the trimming of the work piece to the desired dimensions by limiting the respective movements.

I claim:

1. A method for controlling motions, particularly in the machining of solid materials by machine tools, comprising adjusting by means of a record, the controlling parts of which correspond to numerical units of measurement, a counter to a number corresponding to the number of units of measurement indicating the extent of the desired motion, and limiting the motion by said counter.

2. A method for controlling motions, particularly in the machining of solid materials by machine tools, comprising initiating a desired motion by controlling parts on a record, adjusting a counter by said controlling parts to a number corresponding to the number of units measurement indicating the extent of the desired motion, and causing the operation of the counter to count the units and to limit the motion when the adjusted desired number has been counted.

3. A method for controlling motions, particularly in the machining of solid materials by machine tools, comprising initiating a desired motion by controlling parts on a record, adjusting a counter by said controlling parts to a number corresponding to the number of units of measurement indicating the extent of the desired motion, said adjusted numbers on the counter referring to a measuring base, and causing the operation of the counter to count the units and to limit the motion when the adjusted desired number has been counted.

4. A method for controlling motions, particularly in the machining of solid materials by machine tools, comprising initiating a desired motion by controlling parts on a record, adjusting a counter by said controlling parts to a number corresponding to the number of units of measurement indicating the extent of the desired motion, said adjusted number on the counter referring to a measuring base, adjusting all the tools against said measuring base, and causing the operation of the counter to count the units and to limit the motion when the adjusted desired number has been counted.

5. In a device of the type described, comprising a counter adapted to be set to any number corresponding to the number of units of measurement indicating the desired motion, a record adapted to effect the setting of said counter and means for initiating and for stopping said motion, said counter acting up on said means for stopping said motion when the latter has reached an extent corresponding to the number set up in the counter.

6. In a device of the type described, comprising a counter adapted to be set to any number corresponding to the number of units of measurement indicating the desired motion, elements in said counter for every numeral of every digit and affected by the setting up, a member provided for every digit and adapted to be displaced by the set elements of the counter, means adapted to initiate the desired motion, and means adapted to stop said desired motion when said members of all the digits, in which elements have been set, are simultaneously displaced.

7. In a device of the type described, comprising a counter adapted to be set to any number corresponding to the number of units of measurement indicating the desired motion, elements in said counter for every numeral of every digit and affected by the setting up, a member provided for every digit and adapted to be consecutively displaced, starting with the member of the highest digit, by the set up element of the counter when the counter is operative, means adapted to initiate the desired motion, and means adapted to stop said desired motion when said members of all the digits, in which elements have been set, are simultaneously displaced.

8. In a device of the type described, comprising a counter adapted to be set to any number corresponding to the number of units of measurement indicating the desired motion, elements in said counter for every numeral of every digit and affected by the setting of a number, a record provided with controlling parts, the position of the latter corresponding to a number of units of measurement and these controlling parts causing the setting of the elements of the counter, a member provided for every digit and adapted to be displaced by the set elements of the counter, means adapted to initiate the desired motion, and means adapted to stop said desired motion when said members of all the digits, in which elements have been set, are simultaneously displaced.

9. In a device of the type described, comprising a counter adapted to be set to any number corresponding to the number of units of measurement indicating the desired motion, elements in said counter for every numeral of every digit and affected by the setting of a number, a record provided with controlling parts, the position of the latter corresponding to a number of units of measurement and these controlling parts causing the setting of the elements of the counter, a member provided for every digit and adapted to be displaced by the set elements of the counter, means adapted to initiate the desired motion, means adapted to stop said desired motion when said members of all the digits, in which elements have been set, are simultaneously displaced, contrivances for performing duties in the machine tool, and further controlling parts on the record influencing said contrivances.

10. In a device of the type described, comprising a counter adapted to be set to any number corresponding to the number of units of measurement indicating the desired motion, elements in said counter for every numeral of every digit and affected by the setting of a number, a record provided with perforations acting as controlling parts, the position of said perforations corresponding to a number of units of measurement, feeler rods adapted to cooperate with said perforations and causing the setting of the elements of the counter, and means for initiating and for stopping said motion, said counter acting upon said means for stopping said motion when the latter has reached an extent corresponding to the number set up in the counter.

11. In a device of the type described, comprising a counter adapted to be set to any number corresponding to the number of units of measurement indicating the desired motion, elements in said counter for every numeral of every digit and affected by the setting of a number, a record provided with perforations acting as controlling parts, the position of said perforations corresponding to a number of units of measurement, feeler rods adapted to cooperate with said perforations and causing the setting of the elements of the counter, contrivances for performing duties in the machine tool, a control shaft provided for each contrivance, a disengageable clutch inserting in each control shaft, and means influenced by said feeler rods for cutting in and out said clutches.

12. In a device of the type described, comprising a counter adapted to be set to any number corresponding to the number of units of measurement indicating the desired motion, elements in said counter for every numeral of every digit and affected by the setting of a number, a record provided with perforations acting as controlling parts, the position of said perforations corresponding to a number of units of measurement, feeler rods adapted to cooperate with said perforations and causing the setting of the elements of the counter, contrivances for performing duties in the machine tool, a control shaft provided for each contrivance, a disengageable clutch inserting in each control shaft, abutments displaced by said feeler rods for cutting in and out said clutches, and cables interposed between said feeler rods and said abutments.

13. In a device of the type described, comprising a counter adapted to be set to any number corresponding to the number of units of measurement indicating the desired motion, elements in said counter for every numeral of every digit and affected by the setting of a number, a record provided with perforations acting as controlling parts, the position of said perforations corresponding to a number of units of measurement, feeler rods adapted to cooperate with said perforations and causing the setting of the elements of the counter, means adapted to impart a step by step movement to said record, means adapted to control said first mentioned means to prevent their operation until the performance controlled by the previous set of perforations on the record has been completed, and means for initiating and for stopping said motion, said counter acting upon said means for stopping said motion when the latter has reached an extent corresponding to the number set up in the counter.

14. In a device of the type described, comprising a counter adapted to be set to any number corresponding to the number of units of measurement indicating the desired motion, elements in said counter for every numeral of every digit and affected by the setting of a number, a record provided with perforations acting as controlling parts, the position of said perforations corresponding to a number of units of measurement, feeler rods adapted to cooperate with said perforations and causing the setting of the elements of the counter, means adapted to impart a step by step movement to said record, means adapted to control said first mentioned means to prevent their operation until the performance controlled by the previous set of perforations on the record has been completed, a driving shaft, a driven shaft, a change speed gearing interposed between said two shafts, disengageable clutches interposed in the gearing, and means influenced by feeler rods for cutting in and out said clutches.

15. In a device of the type described, comprising a counter adapted to be set to any number corresponding to the number of units of measurement indicating the desired motion, elements in said counter for every numeral of every digit and affected by the setting of a number, a record provided with perforations acting as controlling parts, the position of said perforations corresponding to a number of units of measurement, feeler rods adapted to cooperate with said perforations and causing the setting of the elements of the counter, means adapted to impart a step by step movement to said record, means adapted to control said first mentioned means to prevent their operation until the performance controlled by the previous set of perforations on the record has been completed, a driving shaft, a driven shaft, a change speed gearing interposed between said two shafts, disengageable clutches interposed in the gearing, a control shaft, cam disks on said control shaft, swingably mounted elements cooperating with said cam disks and for the cutting in and out of said clutches, said swingably mounted elements being influenced by said feeler rods, and means for securing the inoperative elements in their inoperative position.

16. In a device of the type described, comprising a counter adapted to be set to any number corresponding to the number of units of measurement indicating the desired motion, elements in said counter for every numeral of every digit, a recess in every element and staggered for the different numerals, holding pawls adapted to enter into said recesses when the counter is displaced without any desired controlled motion corresponding to said displacement occurring, means adapted to cut out the normal drive of the counter during such displacement, a record provided with perforations acting as controlling parts, the position of said perforations corresponding to a number of units of measurement, feeler rods adapted to cooperate with said perforations and causing the setting of the elements of the counter, and means for initiating and for stopping said motion, said counter acting up on said means for stopping said motion when the latter has reached an extent corresponding to the number set up in the counter.

In testimony whereof I have signed my name to this specification.

MAX SCHENKER.